United States Patent
Friesen et al.

(10) Patent No.: US 9,780,394 B2
(45) Date of Patent: Oct. 3, 2017

(54) FUEL CELL WITH TRANSPORT FLOW ACROSS GAP

(75) Inventors: Cody A. Friesen, Mesa, AZ (US); Joel R. Hayes, Chandler, AZ (US)

(73) Assignee: Arizona Board of Regents for and on Behalf of Arizona State University, Tempe, AZ (US)

( * ) Notice: Subject to any disclaimer, the term of this patent is extended or adjusted under 35 U.S.C. 154(b) by 2276 days.

(21) Appl. No.: 11/962,803

(22) Filed: Dec. 21, 2007

(65) Prior Publication Data

US 2010/0119883 A1    May 13, 2010

(51) Int. Cl.
| | | |
|---|---|---|
| *H01M 8/00* | (2016.01) | |
| *H01M 2/00* | (2006.01) | |
| *H01M 8/04089* | (2016.01) | |
| *H01M 4/86* | (2006.01) | |
| *H01M 8/04186* | (2016.01) | |
| *H01M 8/2455* | (2016.01) | |
| *H01M 8/247* | (2016.01) | |
| *H01M 8/08* | (2016.01) | |
| *H01M 8/22* | (2006.01) | |

(52) U.S. Cl.
CPC ..... *H01M 8/04089* (2013.01); *H01M 4/8605* (2013.01); *H01M 8/04186* (2013.01); *H01M 8/247* (2013.01); *H01M 8/2455* (2013.01); *H01M 8/08* (2013.01); *H01M 8/22* (2013.01)

(58) Field of Classification Search
None
See application file for complete search history.

(56) References Cited

U.S. PATENT DOCUMENTS

| | | |
|---|---|---|
| 3,252,838 A | 5/1966 | Huber |
| 3,483,036 A | 12/1969 | Gregor |
| 3,525,643 A | 8/1970 | Spahrbier |
| 3,650,837 A | 3/1972 | Palmer |
| 3,767,466 A | 10/1973 | McCoy |
| 4,317,863 A | 3/1982 | Struthers |
| 4,397,730 A | 8/1983 | Bindra |
| 4,521,497 A | 6/1985 | Tamminen |
| 4,728,584 A | 3/1988 | Isenberg |
| 4,770,753 A | 9/1988 | Ramshaw |
| 4,871,627 A | 10/1989 | Strong |
| 4,894,355 A | 1/1990 | Takeuchi |
| 5,190,833 A | 3/1993 | Goldstein |
| 5,415,949 A | 5/1995 | Stone |
| 5,434,020 A | 7/1995 | Cooper |
| 5,434,833 A | 7/1995 | Lee |
| 5,439,758 A | 8/1995 | Stone |
| 5,567,540 A | 10/1996 | Stone |
| 5,652,068 A | 7/1997 | Shuster |
| 5,830,593 A | 11/1998 | Nielson |

(Continued)

OTHER PUBLICATIONS

International Search Report issued in PCT/US2007/088585, dated May 7, 2008, 4 pages.

(Continued)

*Primary Examiner* — Barbara Gilliam
*Assistant Examiner* — Adam A Arciero
(74) *Attorney, Agent, or Firm* — Pillsbury Winthrop Shaw Pittman LLP

(57) ABSTRACT

The present invention relates to a fuel cell with a gap for transport flow of an electrolyte containing charge carrying ions from either a fuel or an oxidizer between anode and a cathode.

57 Claims, 5 Drawing Sheets

CROSS SECTION

(56) References Cited

U.S. PATENT DOCUMENTS

| | | |
|---|---|---|
| 6,057,052 A | 5/2000 | Shrim |
| 6,299,998 B1 | 10/2001 | Morris |
| 6,312,846 B1 | 11/2001 | Marsh |
| 6,355,369 B1 | 3/2002 | Iarochenko |
| 6,383,673 B1 | 5/2002 | Faris |
| 6,410,174 B1 | 6/2002 | Faris |
| 6,458,480 B1 | 10/2002 | Morris |
| 6,472,093 B2 | 10/2002 | Faris |
| 6,544,678 B2 | 4/2003 | Faris |
| 6,558,830 B2 | 5/2003 | Faris |
| 6,562,504 B2 | 5/2003 | Faris |
| 6,566,000 B1 | 5/2003 | Iarochenko |
| 6,569,555 B1 | 5/2003 | Faris |
| 6,641,943 B1 | 11/2003 | Faris |
| 6,649,294 B2 | 11/2003 | Faris |
| 6,653,252 B2 | 11/2003 | Kawahara |
| 6,713,206 B2 | 3/2004 | Markoski |
| 6,720,102 B2 | 4/2004 | Edwards |
| 6,756,149 B2 | 6/2004 | Knights |
| 6,787,260 B2 | 9/2004 | Smedley |
| 6,793,799 B2 | 9/2004 | Ozawa |
| 6,838,203 B2 | 1/2005 | Zheng |
| 6,869,713 B2 | 3/2005 | Kamo |
| 6,924,058 B2 | 8/2005 | Ohlsen |
| 6,986,964 B2 | 1/2006 | Faris |
| 7,020,355 B2 | 3/2006 | Lahann |
| 7,150,933 B1 | 12/2006 | McLean |
| 7,226,676 B2 | 6/2007 | Faris |
| 7,238,440 B2 | 7/2007 | Damore |
| 7,252,898 B2 | 8/2007 | Markoski |
| 7,276,309 B2 | 10/2007 | Smedley |
| 7,291,186 B2 | 11/2007 | Zhang |
| 7,303,835 B2 | 12/2007 | Mathias |
| 2001/0007725 A1 | 7/2001 | Faris |
| 2002/0028372 A1 | 3/2002 | Ohlsen |
| 2002/0045075 A1 | 4/2002 | Pinto |
| 2003/0054217 A1 | 3/2003 | Faris |
| 2003/0077501 A1 | 4/2003 | Knights |
| 2003/0134163 A1* | 7/2003 | Markoski et al. ............... 429/13 |
| 2003/0143446 A1 | 7/2003 | Faris |
| 2003/0165727 A1* | 9/2003 | Priestnall et al. ............... 429/34 |
| 2003/0180600 A1* | 9/2003 | Naruse ................ H01M 8/0271 429/458 |
| 2003/0190504 A1 | 10/2003 | Fisher |
| 2003/0198862 A1 | 10/2003 | Struthers |
| 2004/0005488 A1 | 1/2004 | Faris |
| 2004/0023112 A1 | 2/2004 | Lin |
| 2004/0053132 A1 | 3/2004 | Smedley |
| 2004/0058203 A1 | 3/2004 | Priestnall |
| 2004/0058217 A1 | 3/2004 | Ohlsen |
| 2004/0058226 A1 | 3/2004 | Lamarre |
| 2004/0121208 A1 | 6/2004 | James |
| 2004/0146764 A1 | 7/2004 | Tsai |
| 2004/0157092 A1 | 8/2004 | Kimberg |
| 2004/0157101 A1 | 8/2004 | Smedley |
| 2004/0180246 A1 | 9/2004 | Smedley |
| 2004/0185323 A1 | 9/2004 | Fowler |
| 2004/0197637 A1 | 10/2004 | Blum |
| 2004/0229107 A1 | 11/2004 | Smedley |
| 2004/0247969 A1 | 12/2004 | Faris |
| 2005/0019634 A1 | 1/2005 | Legg |
| 2005/0084737 A1 | 4/2005 | Wine |
| 2005/0112424 A1* | 5/2005 | Hirano et al. ............... 429/20 |
| 2005/0196656 A1 | 9/2005 | Gomez |
| 2005/0208343 A1 | 9/2005 | Kim |
| 2006/0003217 A1* | 1/2006 | Cohen et al. ............... 429/34 |
| 2006/0024551 A1 | 2/2006 | Smotkin |
| 2006/0076295 A1 | 4/2006 | Leonard |
| 2006/0210867 A1 | 9/2006 | Kenis |
| 2006/0228622 A1 | 10/2006 | Cohen |
| 2006/0269826 A1 | 11/2006 | Katz |
| 2006/0292407 A1 | 12/2006 | Gervasio |
| 2007/0020496 A1 | 1/2007 | Pelton |
| 2007/0048577 A1 | 3/2007 | Ringeisen |
| 2007/0077491 A1 | 4/2007 | Burchardt |
| 2007/0092787 A1 | 4/2007 | Wang Chen |
| 2007/0141440 A1 | 6/2007 | Yang |
| 2007/0154766 A1 | 7/2007 | Baik |
| 2007/0224500 A1 | 9/2007 | White |
| 2007/0248845 A1 | 10/2007 | Armstrong |
| 2007/0248868 A1 | 10/2007 | Haltiner, Jr. |
| 2007/0259234 A1 | 11/2007 | Chua |
| 2007/0264550 A1 | 11/2007 | Zhang |
| 2007/0287034 A1 | 12/2007 | Minteer |
| 2008/0008911 A1 | 1/2008 | Stroock |
| 2008/0009780 A1 | 1/2008 | Leonard |
| 2008/0026265 A1 | 1/2008 | Markoski |
| 2008/0032170 A1 | 2/2008 | Wainright |
| 2008/0044721 A1 | 2/2008 | Heller |

OTHER PUBLICATIONS

Written Opinion of the International Searching Authority issued in PCT/US2007/088585, dated May 7, 2008, 6 pages.

PCT/US07/88585 filed Dec. 21, 2007, Intl Prelim. Report on Patentability dated Mar. 24, 2011 (8 pages).

Kjeang et al., "A Microfluidic Fuel Cell with Flow-through Porous Electrodes", JACS Articles, J. Am. Chem. Soc, 2008, vol. 130, pp. 4000-4006.

European Office Action in European Patent Application No. 07869765.3, dated Oct. 25, 2011.

Cohen et al., "Fabrication and preliminary testing of a planar membraneless microchannel fuel cell", *Journal of Power Sources*, vol. 139, 2005, pp. 96-105.

Ferrigno et al., "Membraneless Vanadium Redox Fuel Cell Using Laminar Flow", *J. Am. Chem. Soc.*, vol. 124, 2002, pp. 12930-12931.

Jayashree et la., "Air-Breathing Laminar Flow Based Microfluidic Fuel Cell", *J. Am. Chem. Soc.*, vol. 127, 2005, pp. 16758-16759.

\* cited by examiner

MACRO-FLUIDIC FUEL CELL ACROSS A GAP:
TUBULAR CROSS SECTIONS

FUEL CELL WITH TRANSPORT FLOW ACROSS GAP

The present application claims priority to U.S. Provisional Application No. 60/871,145, filed Dec. 21, 2006, the entirety of which is hereby incorporated into the present application by reference.

FIELD OF THE INVENTION

The present application relates to a fuel cell, and more particularly a fuel cell wherein a transport flow of electrolyte carries fuel or oxidizer ions across a gap between an anode and a cathode.

BACKGROUND OF THE INVENTION

If fuel cells are to become viable portable power sources in the future, solutions to a number of difficult, persistent technical problems are needed. Most of these problems are associated with the presence of the proton exchange membrane, which is highly sensitive to various factors, such as operating temperatures and membrane humidity. Efforts in portable applications have largely focused on reducing the size of proton exchange membrane (PEM) fuel cells. By portable power sources, this is generally referring to substitutes for batteries that power portable electronic devices. This approach carries all the cost and efficiency issues associated with larger scale PEM fuel cells. Moreover, the reduction in size exaggerates some of these problems, and introduces even further problems that require resolution for a commercially viable product.

One approach has been to deliver laminar flows of oxidizer and fuel saturated electrolytes into a single channel with a cathode on one side and an anode on another. See, e.g., Membraneless Vanadium Redox Fuel Cell Using Laminar Flow, Ferrigno et al., J. Amer. Chem. Soc. 2002, 124, 12930-12931; Fabrication and Preliminary Testing of a Planar Membraneless Microchannel Fuel Cell, Cohen et al., J. Power Sources, 139, 96-105; and Air-Breathing Laminar Flow-Based Microfluidic Fuel Cell, Jayashree et al., J. Am. Chem. Soc., 2005, 127, 16758-16759. See also, U.S. Pat. Nos. 7,252,898 and 6,713,206. Each of these is incorporated into the present application by reference in their entirety for background teachings.

This approach has various shortcomings. First, the fuel and oxidizer will mix downstream of the entry point, wasting the majority of the fuel. This is inefficient. Second, the diffusivity of many oxidizers leads to mixed potentials at the anode due to oxidizer crossover to the anode. This takes energy away from the circuit and also leads to inefficiency of the overall cell. Third, the architecture of the cell is restricted to the geometries, lengthscales, and electrolytes where laminar flow is ensured.

U.S. Patent Publication Nos. 2003/0165727 and 2004/0058203 disclose mixed reactant fuel cells where the fuel, oxidant and electrolyte are mixed together and then flow through the anode and cathode. These publications are incorporated herein by reference. According to these publications, the anode is allegedly selective for fuel oxidation and the cathode is allegedly selective for oxidizer reduction. The designs in these publications have significant shortcomings. First, the amount of some oxidizers that can be typically carried by an electrolyte is relatively low (e.g., the oxygen solubility in an electrolyte is typically quite low relative to fuel solubility). This means that a relatively high flow rate is required for the mixed reactants to ensure that an ample amount of oxidizer is flowing through the cell. That is, a relatively high flow rate is required to maximize oxidizer exposure and reaction at the cathode. But increasing the flow rate requires increased work, thus detracting from the overall power efficiency of the cell. Moreover, electrodes that are selective by virtue of their material properties tend to have lower reaction activity rates than non-selective electrodes. Because the designs in these two publications rely primarily on the use of selective electrodes for both the cathode and anode, this further detracts from the efficiency of the cell.

The present application endeavors to meet the long-felt and unresolved need for a fuel cell technology that eliminates the use of a proton exchange membrane, yet operates efficiently and effectively.

SUMMARY OF THE INVENTION

One aspect of the present application provides a fuel cell using an electrolyte flow for transporting the ions formed from reduction/oxidation of a reactant at a first electrode to a second electrode. The fuel cell is for use with an electrolyte and reactants comprising a fuel and an oxidizer. The fuel cell comprises electrodes comprising (i) an anode for oxidizing the fuel into at least positive fuel ions and electrons, and (ii) a cathode for accepting electrons and reducing the oxidizer into at least negative oxidizer ions. The anode and the cathode are spaced apart to define a gap therebetween and are connectable to a load. A first input is provided for delivering a first of the reactants to a first of the electrodes. The first input is upstream of or at the first electrode. A second input is provided for delivering a second of the reactants to a second of the electrodes. The second input is downstream of the first electrode. A flow generator is provided for generating a transport flow of the electrolyte from the first electrode to the second electrode across the gap to transport the ions formed from the first reactant oxidized or reduced at the first electrode for reaction with the ions formed from the second reactant oxidized or reduced at the second electrode. As a preferred feature, the flow generator is configured to generate the transport flow across the gap at a rate higher than a diffusion rate of the second reactant oxidized or reduced at the second electrode or the ions thereof within the electrolyte to essentially prevent diffusion thereof to the first electrode.

Another aspect of the present application provides a fuel cell system using an electrolyte flow for transporting the ions formed from reduction/oxidation of a reactant at a first electrode to a second electrode. The system comprises a fuel source comprising a fuel, an oxidizer source comprising an oxidizer, the fuel and the oxidizer being reactants, and electrodes comprising: (a) an anode communicated to the fuel source for receiving the fuel and oxidizing the fuel into at least positive fuel ions and electrons, and (b) a cathode communicated to the oxidizer source for accepting electrons and reducing the oxidizer into at least negative oxidizer ions. The anode and the cathode are spaced apart to define a gap therebetween and are connectable to a load. A first input is provided for delivering a first of the reactants to a first of the electrodes. The first input is upstream of or at the first electrode. A second input is provided for delivering a second of the reactants to a second of the electrodes. The second input is downstream of the first electrode. An electrolyte is in the gap between the anode and the cathode. A flow generator is provided for generating a transport flow of the electrolyte from the first electrode to the second electrode across the gap to transport the ions formed from the first reactant oxidized or reduced at the first electrode for reaction with the ions formed from the second reactant oxidized or reduced at the second electrode. As a preferred feature, the flow generator is configured to generate the transport flow across the gap at a rate higher than a diffusion rate of the second reactant oxidized or reduced at the second electrode or the ions thereof within the electrolyte to essentially prevent diffusion thereof across the gap to the first electrode.

Another aspect of the present application provides a method for generating electrical current using a fuel cell comprising electrodes comprising: (i) a cathode, and (ii) an anode, the anode and the cathode being spaced apart to define a gap therebetween. In the method, an electrolyte flow transports the ions formed from reduction/oxidation of one reactant at a first electrode to second electrode. The method comprises:

providing reactants comprising a fuel and an oxidizer;
delivering a first of the reactants to a first of the electrodes via a first input upstream of or at the first electrode;
delivering a second of the reactants to a second of the electrodes via a second input downstream of the first electrode; and
generating a transport flow of the electrolyte across the gap to transport the ions formed from the first reactant oxidized or reduced at the first electrode for reaction with the ions formed from the second reactant oxidized or reduced at the second electrode.

Preferably, the transport flow flows across the gap at a rate higher than a diffusion rate of the reactant oxidized or reduced at the second electrode or the ions thereof within the electrolyte to essentially prevent diffusion thereof to the first electrode.

Another aspect of the present application provides a method using a partial mixed reactant approach. The method generates electrical current using a fuel cell comprising: (i) a cathode, and (ii) an anode, the anode and the cathode being spaced apart to define a gap therebetween. The method comprises:

flowing a flow comprising fuel and electrolyte through the anode to oxidize the fuel at the anode into at least positive fuel ions and electrons for conduction by the anode, the fuel being present in the flow flowing through the anode at a concentration high enough that only part of the fuel flowing through the anode is oxidized, wherein the flow exiting the anode comprises the electrolyte, the positive fuel ions, and the unoxidized fuel;
flowing the flow comprising the electrolyte, the positive fuel ions and the unoxidized fuel exiting the anode across the gap to the cathode;
delivering an oxidizer downstream of the anode for exposure to the cathode;
reducing the oxidizer at the cathode with electrons conducted to the cathode into at least negative oxidizer ions such that the negative oxidizer ions react with the positive fuel ions, the cathode being selective for reduction of the oxidizer in preference to oxidation of the unoxidized fuel, wherein the flow leaving the cathode comprises the electrolyte, the unoxidized fuel, and the by-product of the reaction of the positive fuel ions and the negative oxidizer ions.

Another aspect of the present application provides another method using a partial mixed reactant approach. The method generates electrical current using N fuel cells in series, wherein N is an integer greater than 1, each fuel cell comprising: (i) a cathode, and (ii) an anode, each anode and each cathode being spaced apart to define a gap therebetween; and wherein the fuel cells are arranged in an array in series such that the cathode of each of fuel cell at positions 1 to N−1 in the array is communicated to the anode of the subsequent fuel cell. The method comprises:

flowing a flow comprising fuel and electrolyte through the array with the flow flowing through the anode and to the cathode of each fuel cell in the array, and delivering an oxidizer downstream of the anode of each fuel cell in the array for exposure to the cathode such that:

(i) each anode oxidizes the fuel into at least positive fuel ions and electrons for conduction by the anode, the fuel being present in the flow flowing through the anodes of the fuel cells at at least positions 1 to N−1 in the array at concentrations high enough that only part of the fuel flowing through the anodes is oxidized, wherein the flow exiting the anodes of the fuel cells at positions 1 to N−1 in the array comprises the electrolyte, the positive fuel ions, and the unoxidized fuel, and wherein the flow exiting the anode of the fuel cell at position N in the array comprises the electrolyte and the positive fuel ions;

(ii) the flow exiting the anodes of the fuel cells flows across the associated gaps to the associated cathodes;

(iii) the oxidizer delivered downstream of the anode is exposed to the associated cathode;

(iv) the oxidizer is reduced at the cathode of each fuel cell with electrons conducted to the cathode into at least negative oxidizer ions such that the negative oxidizer ions react with the positive fuel ions in the flow at each cathode, each of the cathodes of the fuel cells being selective for reduction of the oxidizer in preference to oxidation of the unoxidized fuel, wherein the flow leaving the cathodes of the fuel cells at positions 1 to N−1 comprises the electrolyte, the unoxidized fuel, and the by-product of the reaction of the positive fuel ions and the negative oxidizer ions, and wherein the flow leaving the cathode of the fuel cell at position N in the array comprises the electrolyte and the by-product of the reaction of the positive fuel ions and negative oxidizer ions;

(v) the flow leaving the cathode of each fuel cell at positions 1 to N−1 in the array flows to the anode of the subsequent fuel cell for delivering the electrolyte and unoxidized fuel to the subsequent anode for oxidation; and (vi) the flow leaves the cathode of the fuel cell at position N in the array.

Another aspect of the invention provides a partial mixed reactant fuel cell system. The fuel cell system comprises a fuel and electrolyte source comprising a fuel and an electrolyte, an anode communicated to the fuel and electrolyte source for receiving a flow comprising the fuel and electrolyte, and a cathode. The anode and the cathode are spaced apart to define a gap therebetween and are connectable to a load. A flow generator is provided for flowing the flow comprising the fuel and electrolyte through the anode and to the cathode such that the anode oxidizes the fuel into at least positive fuel ions and electrons for conduction by the anode. A concentration of fuel in the fuel source is high enough that only part of the fuel flowing through the anode is oxidized so that the flow exiting the anode comprises the electrolyte, the positive fuel ions, and the unoxidized fuel. An oxidizer input is provided downstream of the anode for delivering oxidizer for exposure to the cathode. The cathode is selective to reduce the oxidizer with electrons conducted to the cathode into at least negative oxidizer ions so that the negative oxidizer ions react with the positive fuel ions, with the cathode being selective for reduction of the oxidizer in preference to oxidation of the unoxidized fuel such that the flow leaving the cathode comprises the electrolyte, the unoxidized fuel, and the by-product of the reaction of the positive fuel ions and the negative oxidizer ions.

Another aspect of the present application provides a partial mixed reactant fuel cell system comprising a fuel and electrolyte source comprising a fuel and an electrolyte, and N fuel cells in series, wherein N is an integer greater than 1. Each fuel cell comprises an anode and a cathode. The anode and the cathode are spaced apart to define a gap therebetween and are connectable to a load. The fuel cells are arranged in series in an array such that the cathode of each of the fuel cells at positions 1 to N−1 in the array is communicated to the anode of the subsequent fuel cell. The anode of the fuel cell at position 1 in the array is communicated to the fuel and electrolyte source for receiving a flow comprising the fuel and electrolyte. A flow generator is provided for flowing the flow comprising the fuel and electrolyte through the anode and to the cathode of each fuel cell in the array. Oxidizer inputs are provided downstream of the anodes of each fuel cell in the array for delivering oxidizer for exposure to each cathode. The flow generator is configured to generate the flow through the anodes and to the cathode of each fuel cell in the array, and a concentration of fuel in the fuel and electrolyte source being flowed through the anode of the fuel cell at position 1 is high enough such that during operation of the fuel cell system the fuel is present in the flow flowing through the anodes of the fuel cells at at least positions 1 to N−1 in the array at concentrations high enough that only part of the fuel flowing through the anodes is oxidized.

Other objects, features, and advantages of the present invention will become apparent from the following detailed description, the accompanying drawings, and the appended claims.

DETAILED DESCRIPTION OF THE ILLUSTRATED EMBODIMENT(S) OF THE INVENTION

The Figures illustrate exemplary embodiments of various aspects of the inventions claimed. These embodiments are in no way intended to be limiting, and are intended only as an example for facilitating an understanding of the principles of the claimed inventions.

Figure 1:
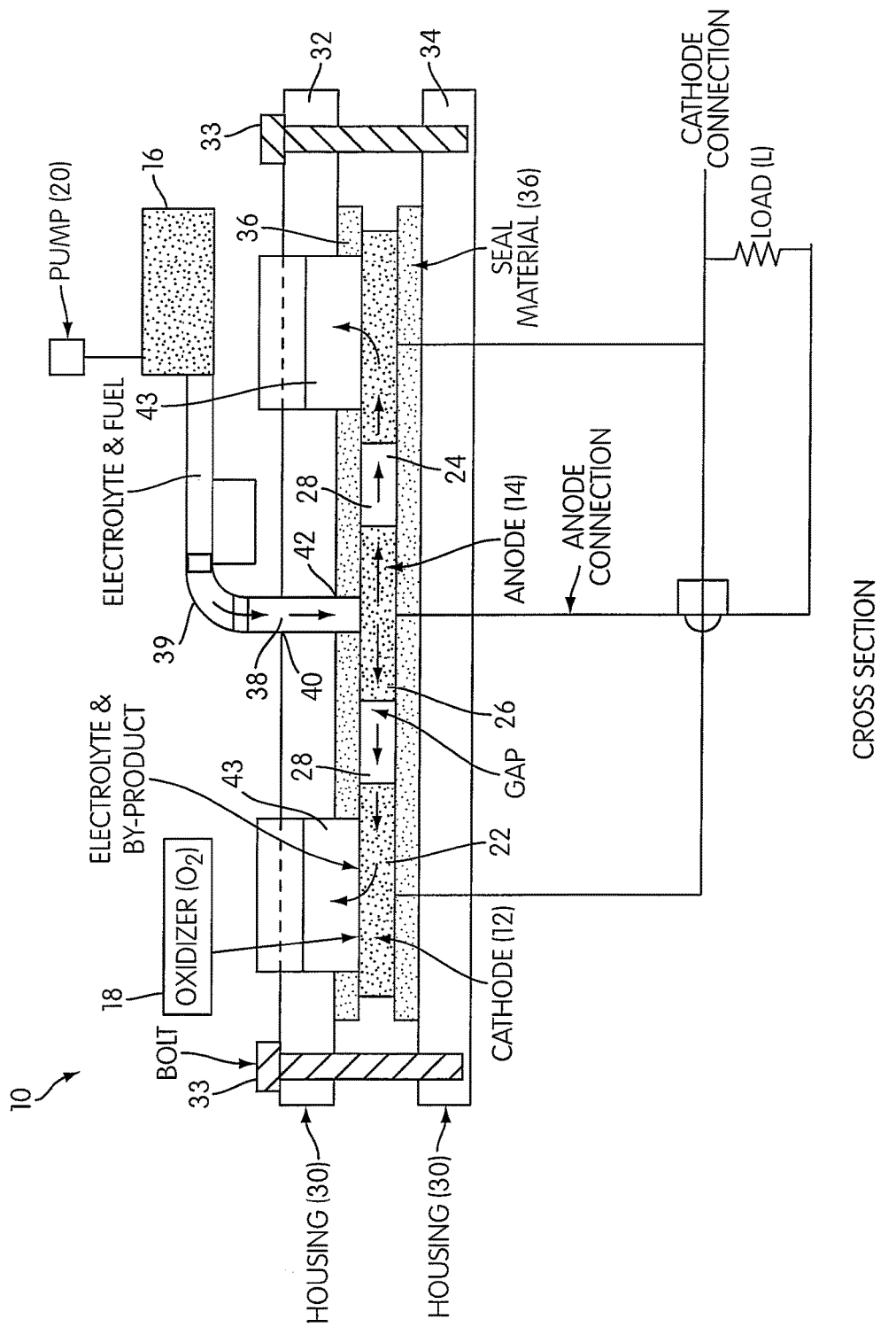
FIG. 1 is an enlarged cross-sectional view of a fuel cell constructed in accordance with the present invention.
Figure 2:
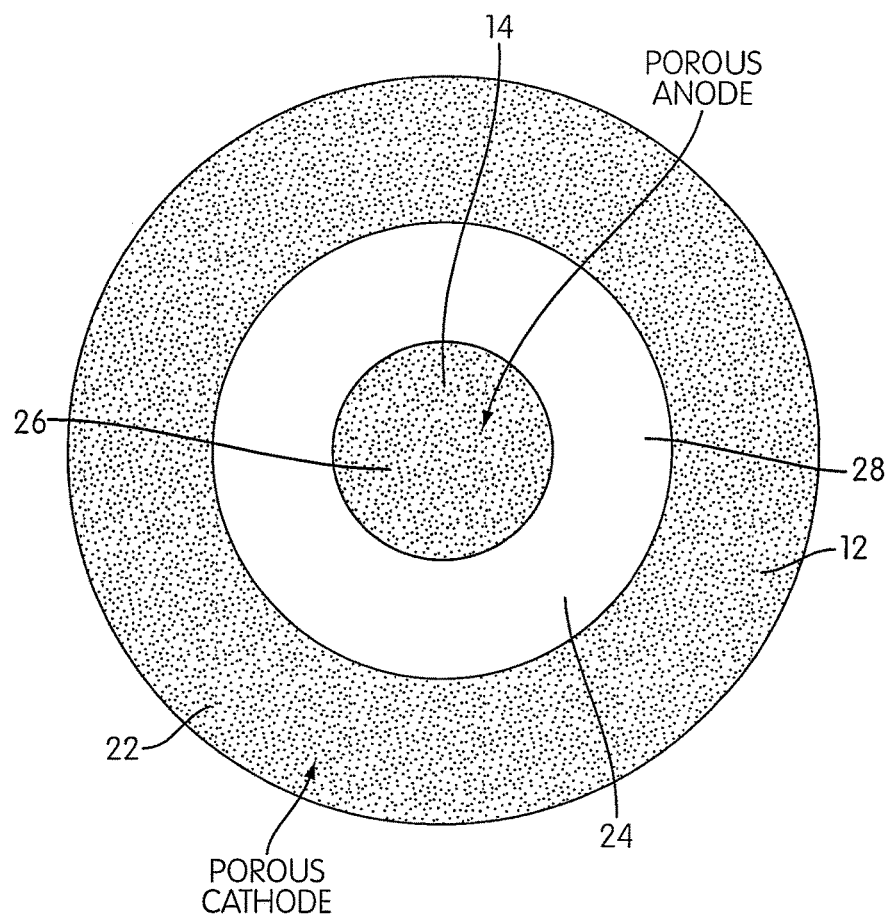
FIG. 2 is a view showing the arrangement of the cathode and the anode in the fuel cell of FIG. 1.

In the illustrated embodiment of FIGS. 1-2, the fuel cell is generally indicated at 10. The fuel cell 10 has a cathode 12, an anode 14, a fuel and electrolyte source 16, an oxidizer source 18, and a flow generator 20. In some instances, various components are illustrated schematically, as it is understood many different structures may be used.

The cathode 12 comprises a porous body 22, and is optionally configured with an anode receiving space 24. In the illustrated embodiment, the cathode 12 has an annular configuration surrounding the anode receiving space 24. As illustrated, the cathode 12 has a circular configuration with an inner diameter and an outer diameter. This illustrated configuration, however, is not limiting, and the cathode 12 could have any other shape or configuration other than that illustrated.

The anode 14 comprises a porous body 26, and is received in the anode receiving space 24 of the cathode 12 with a gap 28 between the anode 14 and the cathode 12. Specifically, the gap 28 is formed between the porous bodies 22 and 26. The gap 28, in the context of this application, is defined as being devoid of any ion conducting membrane. It will typically be an essentially empty gap for permitting fluid flow from the anode porous body 26 to the cathode porous body 22. The gap 28 may have channels or other features for facilitating flow of electrolyte and oxidized fuel (as discussed below), but does not have a proton exchange membrane, and instead allows fluid flow of the electrolyte and oxidized fuel across the gap 28 from the anode 14 to the cathode 12, as discussed below. For example, the gap 28 could be occupied by a porous, non-reactive, and non-conductive spacer that still allows the flow, such as a spacer having a honeycomb configuration or a porous fit.

In the illustrated embodiment, the anode 14 has a circular configuration with an outer diameter smaller than the inner diameter of the cathode 12 to define the gap 28 as a circular gap. However, this configuration is not intended to be limiting, and the anode could have any other shape or configuration other than that illustrated. Preferably, the gap 28 between the anode's porous body 26 and the cathode's porous body 22 is essentially constant, but in some configurations this may be altered.

The porous body 26 of the anode 14 comprises a catalyst material, such as platinum, for catalyzing the fuel oxidization, which will be discussed below. Preferably, this anode 14 is formed from a known process as taught in U.S. Pat. No. 4,977,038 to Sieradzki et al., the entirety of which is incorporated herein. In one embodiment, the anode may be formed in accordance with this process by forming an alloy of Pt—Ru—Cu and using an acid to leach the Cu from the body. This leaves a bi-continuous nanoporous body of essentially Pt—Ru with a porosity on the order of 3 nm. The platinum (Pt) catalyzes the fuel oxidation reaction, while the ruthenium (Ru) is beneficial for facilitating conversion of carbon monoxide to carbon dioxide in the exemplary reactions discussed below. The porosity may have other sizes, and may be in the ranges of 1 nm to 100 µm, 5 nm to 50 µm, or 10 nm to 10 µm. These examples are not intended to be limiting, and other porosities may be used.

Additionally, other materials or methods of forming the porous body 26 of the anode 14 may be used. For example, the porosity may be provided by channels, grooves, bores, pores, or any other formations exposing surface area for the activity of the reduction/oxidation process. Thus, the term porous encompasses any type of configuration for increasing surface area and allowing ingress of fluid.

The term porous may characterize any electrode (cathode or anode) with a high amount of surface area for driving the reduction/oxidation associated therewith.

In the illustrated embodiment, and particularly for portable applications, the anode disk is approximately 1 µm thick and 1 cm in diameter. It may also be in the range of 100 nm to 1 mm, 200 nm to 0.5 mm, or 300 nm to 0.1 mm for thickness, and 1 mm to 10 cm, 5 mm to 5 cm, or 1 cm to 3 cm for diameter. These examples are not intended to be limiting, and the porous body 26 may have other sizes and configurations. For example, for larger scale non-portable fuel cells, the size may be much larger.

The porous body 22 of the cathode 12 also comprises a catalyst material, such as platinum, for catalyzing reduction of the oxidizer, which will be discussed below. In the illustrated embodiment, the porous body 22 of the cathode 12 is made in the same way and from the same materials as the anode's porous body 26, discussed above. However, the cathode's porous body 22 may be made using different techniques. And, it is not necessary that the cathode and anode porous bodies 22, 26 be made in the same way.

Typically, the cathode porous body 22 will have the same thickness as the anode porous body 26, but that is not critical and different thicknesses may be used for creating a larger functional surface area for the cathodic reaction, discussed below. As to the size of the cathode porous body 22, it preferably has an inner diameter slightly larger than the anode outer diameter to create the gap 28. The outer diameter may be any size larger than the inner diameter. And the gap 28 created between the cathode and anode porous bodies may be in the ranges of 100 nm to 1 cm, 500 nm to 0.5 cm, and 1000 nm to 0.3 cm. These values are merely examples and not intended to be limiting.

The anode 14 and the cathode 12 are disposed in a housing 30, which may comprise two parts 32, 34, each of which may be a plate as illustrated. In the illustrated embodiment, the cathode 12 and anode 14 are seated between the parts 32, 34. A series of bolts 33 are used to secure the parts 32, 34 together, but any other structure may be used. The cathode 12 and anode 14 may be affixed by any suitable means, such as adhesive bonding, welding, or mechanical fastening. The housing 30 may have any construction and configuration, and the illustrated embodiment is not intended to be limiting in any way. In the illustrated embodiment, a sealing material 36 is provided between the porous bodies 22, 26 and the housing parts 32, 34. The sealing material 36 provides a fluid seal between the porous bodies 22, 26 and the housing parts 32, 34 to prevent undesired migration of fuel/electrolyte or oxidizer and ensure that flow is driven through the porous bodies 22, 26. The sealing material may also cover the outer diameter of the cathode porous body 22 to prevent radial outflow of by-product if desired, or this may be permitted in other arrangements.

The anode 14 is communicated to the fuel and electrolyte source 16 for receiving the fuel and the electrolyte within the porous body 26 thereof. This may be done by a fuel input in the form of a fuel inlet (or inlets) upstream or at the anode 14. That is, the inlet(s) leads either directly to the anode 14 or a point upstream of the anode such that the fuel (and preferably the electrolyte) flows through the anode 14. Upstream is defined as relative to the flow through the anode. Preferably, the fuel and electrolyte source 16 comprises a single source with the fuel mixed or in solution with the electrolyte. For example, the fuel may be dissolved in the electrolyte. However, it is also within the scope of the present invention to use separate sources for the fuel and electrolyte and deliver them separately to the anode's porous body 26. These separate sources would be in separate first and second chambers (not shown). In the illustrated embodiment, the fuel inlet is in the form of a channel 38 is formed in the housing part 32 and fluidly communicates the fuel and electrolyte source 16 to the anode's porous body 26. The channel 38 includes an input end 40 for communication to the fuel and electrolyte source 16, and an output end 42 for delivering the fuel to the anode's porous body 26. A conduit 39 couples the fuel and electrolyte source to the channel 38. Any suitable connections, conduits, channels, or passages may be used to communicate the fuel and electrolyte from their source(s) to the anode porous body 26.

During operation, when the anode 14 and the cathode 12 are coupled to a load L, fuel oxidation occurs to oxidize the fuel into at least positive fuel ions that remain in the electrolyte and electrons for conduction by the anode 14 to the cathode 12 through the load L. The corresponding oxidation reaction will be discussed below.

The flow generator 20 generates a transport flow wherein the electrolyte and at least the oxidized positive fuel ions flow across the gap 28 from the porous body 26 of the anode 14 to the porous body 22 of the cathode 14. The term "transport flow" refers to a fluid flow of the electrolyte across the gap, which transports the oxidized fuel ions to the cathode porous body. Thus, the ions are transported convectively, rather than relying solely on conduction. In contrast, in fuel cells with proton exchange membranes, the membrane itself is an electrolyte that transports the oxidized fuel ions by conduction. Here, the primary direction of the transport flow is from the anode porous body 26 to the cathode porous body 22; as opposed to the prior art approach where two streams of oxidizer and fuel are caused to flow along a path parallel to the anode and cathode. Stated differently, a vector or gradient describing the flow would be primarily oriented from one electrode to the other, as opposed to being oriented parallel to them.

Preferably, the pressure drop across the anode is greater than the pressure drop across the cathode, thus discouraging backflow or a pressure build-up and turbulence in the gap.

The flow generator could also be passively operated, such as by gravity feed or by motion of the device (e.g., for a portable cell, such as in a watch, kinetic energy from motion of the user could be used to generate the flow). Thus, the term flow generator is intended to broadly encompass both active powered and passive non-powered mechanisms for generating flow.

In the illustrated embodiment, the flow generator 20 is a small pump, which could have any construction or configuration. The pump may be used in various configurations and in fuel cells 10 of various sizes. It has particular applicability where the fuel cell 10 is of portable size, and/or the channels are on the microfluidic scale. In larger scale versions, or in any other size, the flow generator 20 may also be provided by a rotary driver (e.g., a motor) that rotates the anode 14, cathode 12, and associated structure. This rotary motion will cause radial flow of fuel and electrolyte from the anode porous body 26 to the cathode porous body 22, and preferably draws fuel and electrolyte from their source(s) to the anode porous body 26. The rotary driver may be supplemented by a pump, or be used entirely without one.

Any such electrically powered flow generator may be coupled directly or indirectly to the anode and cathode so that it can draw power, thus providing a self-powering fuel cell 10. A battery or other alternative power source may be provided to initially power such a flow generator, and a switch may be used to enable the generator to draw power from the anode and cathode or the alternative power source as needed. A controller may switch the flow generator from the initial power source to the fuel cell output power either (i) at a predetermined time after the fuel cell operation has started, or (ii) when it detects that the fuel cell power output has reached a level sufficient to self-power the flow generator.

The oxidizer source 18 comprises an oxidizer, which will be discussed below. The cathode's porous body 22 is communicated to the oxidizer source 18 for receiving the oxidizer within the porous body 22. This may be done by an oxidizer input in the form of an oxidizer inlet (or inlets) downstream of the anode 14 at a position for delivering the oxidizer, such as one at the gap or at the cathode. That is, the inlet(s) leads either directly to the cathode 12 or to the gap upstream of the cathode 12 (and downstream of the anode 14) such that the oxidizer flows through the cathode 12. In the illustrated embodiment, narrow, axially extending channels may be formed in housing part 32. Alternatively, relatively open spaces 43 may be used, as illustrated. One end is communicated to the oxidizer source, and the other end communicates to the porous body 22 of the cathode 12, either directly or indirectly by opening into the gap so that the flow across the gap flows the oxidizer into the cathode 12. The oxidizer may be delivered to the cathode porous body 22 by a passive transport system. For example, where oxygen present in ambient air is the oxidizer, simply exposing the porous body 22 to ambient air via the open spaces 43 may be sufficient to allow diffusion of oxygen into the cathode porous body 22 (and the portion where the diffusion enters the cathode may be regarded as the oxidizer input). In other embodiments, a pump, such as an air blower, may be used to deliver the oxidizer to the cathode porous body 22 under pressure. The oxidizer source 18 may be a contained source of oxidizer, such as within a chamber that is fluidly communicated to the cathode porous body 22. Likewise, when the oxidizer is oxygen from ambient air, the oxidizer source 18 may be broadly regarded as the delivery mechanism, whether it be passive (e.g., access openings for the air) or active (e.g., pumps, blowers, etc.), by which the air is permitted to flow to the cathode porous body 22. Thus, the term "oxidizer source" is intended to encompass both contained oxidizers and/or arrangements for passively or actively delivering oxygen from ambient air to the cathode porous body 22.

During operation, when the anode 14 and the cathode 12 are coupled to the load L, reaction among at least the oxidizer, the electrons and the oxidized positive fuel ions at the cathode will occur. Because the transport flow across gap 28 delivers the electrolyte with the oxidized fuel ions to the cathode's porous body 22, a reaction at the cathode 12 will occur where the electrons returning to the cathode from the load L, the oxidizer, and the oxidized fuel react at the cathode 12 to complete the circuit and the fuel cell operation to generate electrical power.

In one embodiment, the oxidizer may be oxygen, and the fuel may be a hydrocarbon. It is contemplated that the hydrocarbon may be methanol. Methanol has a narrower flammability range, and thus is better suited for many applications than other fuels, such as pure hydrogen. Because portable devices are likely to be brought on airplanes and in other areas with many people, it is desirable to use the less flammable methanol, as opposed to hydrogen. The oxidizer may be the oxygen present in ambient air, with the ambient air being delivered to the porous body 22 of the cathode 12 or it may be, for example, an oxygen emulsion, an oxygen saturated electrolyte, or an oxygen saturated perflourocarbon/electrolyte emulsion. However, the present invention is not intended to be limited to any specific fuel and/or oxidizer, and others may be used (including hydrogen, any hydrogen containing substance, or any other oxidizable fuel). The use of oxygen and methanol are preferred and advantageous.

The electrolyte may be an aqueous solution. Examples of suitable electrolytes include aqueous solutions comprising sulfuric acid, phosphoric acid, triflic acid, nitric acid, potassium hydroxide, sodium hydroxide, sodium chloride, or lithium chloride. The electrolyte may also use a non-aqueous solvent or an ionic liquid.

Turning to the specific reactions, in one non-limiting embodiment, the electrolyte is an aqueous solution, methanol ($CH_3OH$) is used as the fuel, and oxygen ($O_2$) is used as the oxidizer. The fuel oxidation at the anode's porous body 26 may be generally expressed as follows:

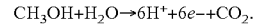
$$CH_3OH + H_2O \rightarrow 6H^+ + 6e^- + CO_2.$$

Thus, the methanol and water from the aqueous solution are disassociated, with the hydrogen from the methanol and water being oxidized to $H^+$ (oxidized, positive fuel ions).

The reduction of the oxidizer at the cathode's porous body may be expressed as follows:

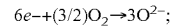
$$6e^- + (3/2)O_2 \rightarrow 3O^{2-};$$

and the reaction of the reduced oxidizer with at least the positive fuel ions may be expressed as:

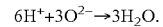
$$6H^+ + 3O^{2-} \rightarrow 3H_2O.$$

The overall reaction at the cathode may also be expressed more generally as:

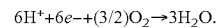
$$6H^+ + 6e^- + (3/2)O_2 \rightarrow 3H_2O.$$

Intermediary reactions may occur at the anode or cathode, and the described reactions are not intended to be exclusive of any side or intermediary reactions.

Thus, the resulting by-products of the overall fuel cell reaction are water, carbon dioxide, and the electricity that drive the load L. These are harmless by-products, as water is completely harmless (and where an aqueous solution is used as the electrolyte will just become part of the electrolyte), and the output of carbon dioxide will be negligible in most portable applications relative to the amount of carbon dioxide that is contained in ambient air.

In alternative embodiments, a different fuel other than methanol may be used, for example, the fuel may be $H_2$ gas, formic acid, ammonia, sodium borohydride, ethanol, lithium, zinc, etc. Likewise, different electrolytes may be used, such as acidic electrolytes, alkaline electrolytes, molten salt electrolytes, molten carbonate electrolytes, etc.

Preferably, the flow generator, by whatever mechanism it is implemented, is configured to generate the transport flow across the gap 28 at a rate higher than a diffusion rate of the oxidizer or its ions within the electrolyte. This essentially prevents diffusion of the oxidizer or ions thereof across the gap 28 to the porous body 26 of the anode 14, thereby reducing or eliminating shorting of the fuel cell circuit or parasitic drainage of the fuel cell's efficiency. This improves overall performance. Moreover, because the flow rate is selected to prevent diffusion of the oxidizer to the anode's porous body 26, the need for a membrane can be avoided. For example, at a diffusivity of $10^{-5}$ cm$^2$/s for the oxidizer or negative ions thereof, and a gap 28 of 100 μm, the transport flow can be set at 10 μm/s to prevent diffusion of the oxidizer ions to the anode 14. This example is illustrative only, and is not intended to be limiting. Preferably, the flow is essentially laminar, and structural features, such as channels or grooves, may be formed in the gap 28 for enhancing laminar flow.

An advantage of using a sufficiently high flow rate is that the flowing electrolyte itself provides the ion conduction and electron insulation effect of the PEM membrane used in conventional fuel cells. That is, the flow rate prevents the reduced oxidizer (or excess unreduced oxidizer) from diffusing across to the anode, and the dielectric behavior of the electrolyte insulates the anode 14 from the cathode 12. This eliminates the need for the PEM membrane, and all the associated problems and management devices associated with it. Also, in some embodiments, because the flow functions to keep the oxidizer from being exposed to the anode, if the fuel is fully or almost oxidized before entering the gap, both electrodes can be made from non-selective materials. However, it is also possible to make the cathode selective for reaction with the oxidizer in the event significant excess fuel may be present in the flow (or if the fuel and electrolyte are one and the same, such as formic acid which is an electrolyte that also has the oxidizable functionality of a fuel). An explanation of selectivity with respect to electrode/reactant activity is provided in further detail below.

One benefit of the configuration illustrated, and which may be achieved in other embodiments, is that the cathode's porous body 22 is larger than the anode's porous body 26, and in particular its surface area is greater. This provides more active area for the cathode side reactions to occur, which are often slower than the reactions on the anode side. Thus, with more surface area, more catalytic surface can be provided for catalyzing the cathode side reaction. This is a benefit that is not achieved by conventional PEM fuel cells, as the cathode and anode are parallel to one another. This difference in size and area can be tailored to match the difference in reaction rates on the anode and cathode sides as needed.

Although the description provided to this point has primarily related to embodiments where the electrolyte flows in an anode-to-cathode direction across the gap to transport positive fuel ions to the cathode porous body, in other embodiments the reverse may occur. For example, in an embodiment using an alkaline electrolyte, the transport flow may be in the cathode-to-anode direction across the gap. Thus, the electrolyte with the negative oxidizer ions therein flows from the cathode porous body to the anode porous body, and this transports the negative oxidizer ions to the anode for reaction with the positive fuel ions. As an option, this may be done with the embodiment of FIGS. 1 and 2, and the position of the anode and cathode porous bodies may be reversed, thus providing more surface area for the anode porous body than for the cathode porous body. Likewise, the cathode and anode could have the same positions as illustrated in FIG. 1, and the flow could be reversed with the electrolyte being delivered to the cathode and flowing across the gap to the anode. And, preferably in such an embodiment where the flow is in the cathode-to-anode direction, the transport flow across the gap may be at a rate higher than a diffusion rate of the fuel or its positive fuel ions within the electrolyte to essentially prevent diffusion of the fuel or its ions across the gap to the porous body of the cathode. Thus, the invention may cover either embodiment with anode-to-cathode flow or cathode-to-anode flow, i.e., any flow from a first electrode for transporting ions from a first reactant to a second electrode for reaction with ions from a second reactant. And thus, any input/inlet, electrode or reactant may be referred to a first or a second one in terms of the flow direction.

In designing the various parts, the structures and various channels can be manufactured on the microfluidic scale to achieve a small, compact size, which is best suited to portability. Various techniques from the formation of microelectronics may be used, such as lithography, thin film deposition, electrochemical processing, and microfluidic processing methodologies may be used. These techniques may be used to enable large scale manufacturing of fuel cells designed in accordance with the present invention.

In applications where the fuel cell operates at a high temperature, the water by-product may evaporate and exit through the openings 43 through which the oxidizer is permitted to enter. In applications where a pump is used to deliver oxidizer to the cathode porous body 22 under pressure, the oxidizer flow may be designed to drive the water off the porous body 22, such as by a separate channel formed in plate 32. This may be desirable in low temperature applications where evaporation does not occur, or does not occur sufficiently rapidly. Also, the water may be suctioned off the cathode porous body 22 for re-circulation to the fuel and electrolyte source. Any mechanism, passive or active, for removing the water by-product may be used, and the present invention is not limited to any particular mechanism. As to the carbon dioxide by-product, this is generally gaseous, and may be permitted to exit the fuel cell in any way.

In alternative embodiments, the anode and cathode porous bodies may have different configurations. For example, to maximize active surface area per unit volume, the cathode and anode porous bodies may have spherical, hemispherical, or other partial spherical configurations. In some embodiments, the anode and cathode porous bodies may be parallel to one another to create the gap. Thus, one porous body need not be within the other. To tailor the amount of active surface area for matching anode and cathode side reaction rates, the porosities of the porous bodies may be different. But, it is not necessary that the reaction rates match, and the design may allow for the anode and cathode reactions to occur at different rates. Generally, any configuration creating a gap for the transport flow may be used.

Figure 3:
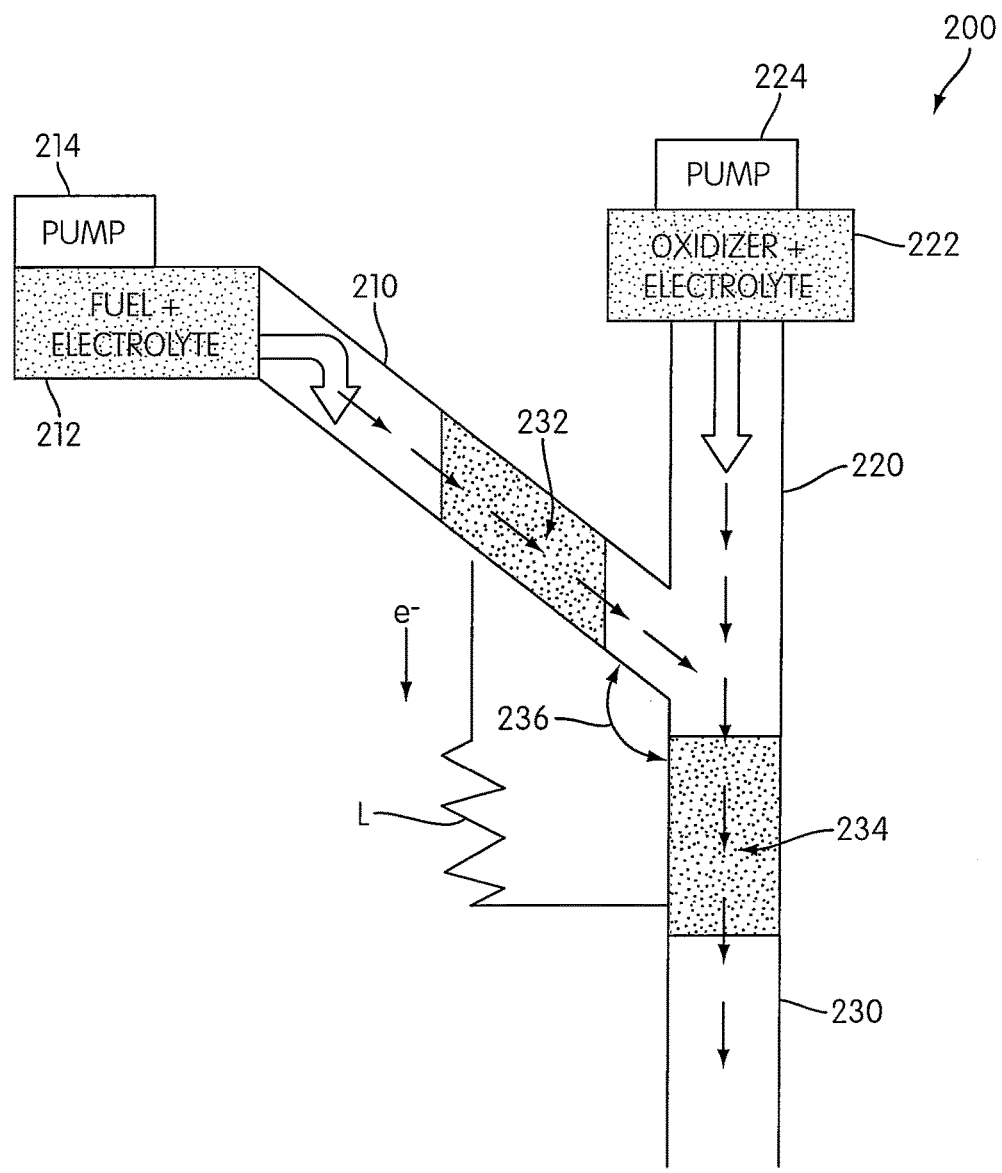
FIG. 3 is a schematic cross-section of an alternative embodiment.

FIG. 3 shows a schematic cross-section of an alternative embodiment of the invention. This embodiment may be created on a microfluidic scale, such as by using the technology mentioned above, or on a macrofluidic scale. In the embodiment of FIG. 3, there are three conduits in the form of tubes.

Conduit 210 extends from a fuel input in the form of a fuel inlet where the fuel and electrolyte is introduced from the fuel and electrolyte source 212, and a pump 214 is used to pump the fuel and electrolyte through conduit 210. Conduit 220 extends from the oxidizer and electrolyte source 222 to an oxidizer input in the form of an oxidizer inlet that delivers the oxidizer into conduit 230, and a pump 224 is used to pump the oxidizer and electrolyte through conduit 220. Conduits 210 and 220 merge together into conduit 230 (and in this embodiment, the oxidizer inlet is at that merger, which is at the gap between the anode and cathode).

An anode porous body 232 is positioned along conduit 210, and a cathode porous body 234 is positioned along conduit 230. The distance between the porous bodies 232, 234 is the gap 236. The load L is schematically shown connected between the anode 232 and cathode 234. This embodiment works similarly to the previously described embodiment, and specific details concerning materials, reactions, flow rate etc. need not be repeated. As the fuel and electrolyte flow through the anode porous body 232, the fuel is oxidized, generating positive ions remaining in the electrolyte, and electrons conducted through the load L to the cathode 234. The electrolyte with the positive fuel ions therein will continue to the cathode porous body 234 at a rate greater than the diffusion rate of the oxidizer and/or its ions back to the anode.

Likewise, as the electrolyte and oxidizer is pumped from the source 222, it flows along conduit 220 to the cathode porous body 234. At the cathode porous body 234, the oxidizer is reduced by the electrons conducted from the load L. And the reduced oxidizer (negative oxidizer ions) reacts with the positive fuel ions. This completes the fuel cell operation in essentially the same manner as discussed above. The electrolyte and the resulting product of the fuel/oxidizer reaction (which is preferably water) exits the cathode porous body 234 by flowing out of it via conduit 230. In some embodiments, the amount of fuel and oxidizer relative to the reactions driven by the anode and cathode, respectively, are controlled such that essentially all the fuel and oxidizer are consumed prior to exiting the cathode 234. As such, if the electrolyte is water or an aqueous solution and the product of the fuel/oxidizer reaction is water, the effluent in conduit 230 may be recirculated or recycled for use.

As was the case with prior embodiments, the embodiment of FIG. 3 may be reversed so that the transport flow is from the cathode to the anode, thus transporting negative oxidizer ions in the flow to the anode for reaction with the positive fuel ions.

Preferably, but not necessarily, a fuel cell constructed in accordance with this invention, including any embodiment described above or below, may be used in portable applications, such as for powering laptops, cell phones, portable audio players, wireless e-mail devices, medical equipment, or any other device for which portability by a person is desirable. However, it should be understood that the present invention may be practiced on larger scale, non-portable devices, and the advantage of portability is not intended to be limiting. To the contrary, the present invention is not limited to portability, but it is believed to be particularly useful for achieving portability.

In another alternative embodiment, a method is provided for generating electrical current using a fuel cell with "partial" mixed reactants. In this partial mixed reactant embodiment, the fuel and electrolyte are flowed through the anode, and then across a gap to the cathode. The fuel is maintained at a high enough concentration that not all the fuel is consumed at the anode, and therefore the mixture or flow crossing the gap includes excess (i.e., unoxidized) fuel, in addition to the electrolyte and the oxidized positive fuel ions. In some embodiments, the oxidizer may be delivered into the gap so that it mixes into the flow crossing the gap to the cathode, and then is reduced at the cathode. In others, it may be delivered directly to the cathode.

In some embodiments, it is possible that some of the oxidizer may drift or diffuse to the anode and be reduced there. But, because the flow is directional and flowing across the gap, the presence of oxidizer at the anode can be minimized, thus allowing for the large majority of the oxidizer reduction to occur at the cathode. To minimize or eliminate the oxidation of the fuel at the cathode (which would reduce efficiency), the cathode is made from a material or materials that is/are selective for reduction of the oxidizer in preference to oxidation of the fuel. But, because the flow across the gap physically transports a majority (and preferably all or essentially all) of the oxidizer to the cathode, the anode may be made from a non-selective material or materials, and need not necessarily use a material or material(s) selective for fuel oxidation in preference to oxidizer reduction.

Figure 4:
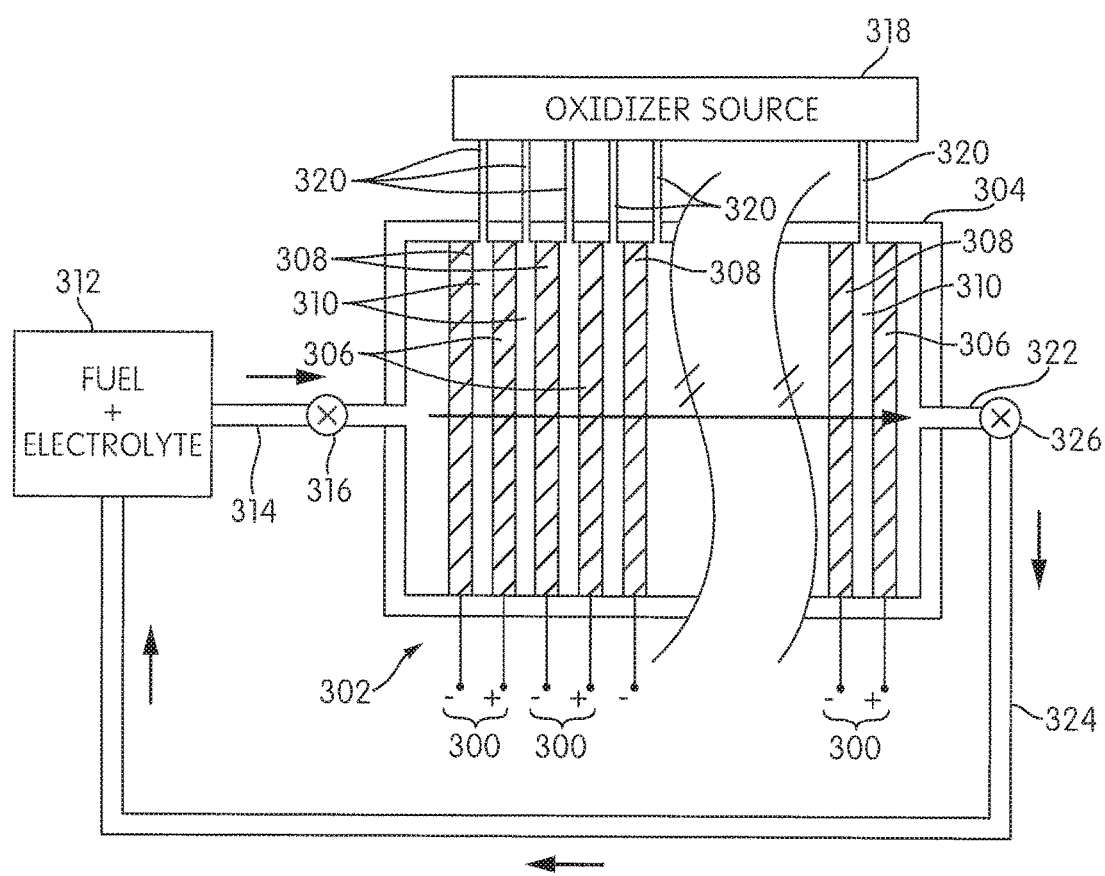
FIG. 4 is a cross-section of yet another alternative embodiment.

FIG. 4 illustrates an example of such a fuel cell 300, and specifically shows a plurality of such fuel cells 300 arranged in an array 302 housed within a housing 304. The example in FIG. 4 is not intended to be limiting, and the fuel cell or array of fuel cells may have any construction or configuration.

In the embodiment of FIG. 4, each fuel cell 300 comprises a cathode 306, and an anode 308. The anode 308 and the cathode 306 are spaced apart to define a gap 310 therebetween. A fuel and electrolyte source 312 containing a fuel and electrolyte (but not the oxidizer) is provided. The fuel and the electrolyte may be the same, such as formic acid in an aqueous solution which exhibits both the functionality of a fuel and the functionality of an electrolyte. In such an embodiment, the requisite amount of formic acid (or other bi-functional component) for providing the electrolyte functionality may be conceptually regarded as the electrolyte, and the remainder as the fuel.

The fuel and electrolyte source 312 is connected by a conduit 314 to the interior of the housing 304 and to the upstream face of the anode 308. A pump (not shown) may be used to drive the flow, and regulate the flow pressure. A check valve 316 may optionally be provided on the conduit 314 for closing off the conduit if desired.

The flow comprising fuel and electrolyte flows through the anode 308 to oxidize the fuel at the anode into at least electrons for conduction by the anode 308 and positive fuel ions. Each anode is shown as being connected to a negative terminal (−), and each cathode 306 is shown as being connected to a positive terminal (+), as when connected to a load the anode(s) 308 deliver(s) electrons to the load via the negative terminal(s) and the cathode(s) 306 receive(s) electrons from the load via the positive terminal(s).

The fuel flowing through the anode 308 is present at a concentration high enough that only part of the fuel flowing through the anode 308 is oxidized. As a result, the flow exiting the anode 308 comprises the electrolyte, the positive fuel ions from the oxidation, and the excess unoxidized fuel. That is, the flow contains more fuel than will be consumed by the oxidation reaction at the anode 308. Then, the flow comprising the electrolyte, the positive fuel ions and the unoxidized fuel exits the anode 308 and flows across the gap 310 to the cathode 306. The pressure of the flow is high enough that the flow is maintained across the gap 310 from the anode 308 to the cathode 306. Thus, a pressure gradient or differential exists between the downstream surface or exit face of the anode 308 and the upstream surface of the cathode 306. The flow rate between the anode 308 and cathode 306, however, does not necessarily need to be higher than the diffusivity rate of the oxidizer in the electrolyte. This can improve the overall efficiency of the cell because less work is required to generate the flow (which can become a more significant issue as the surface area of the electrodes is made larger).

An oxidizer source 318 containing an oxidizer is coupled to the housing 304 by a series of conduits 320 coupled to oxidizer inputs in the form of inlets, each of which delivers the oxidizer into the flow downstream of the anodes 308 for exposure to the cathodes 306. In the illustrated embodiments, the conduits 320 lead into the gaps 310 between the anodes 308 and the cathodes 306 (i.e., upstream of the cathode 306). Instead of individual conduits, a manifold may be used for establishing such communication between the oxidizer source 318 and the gaps 310. The oxidizer may be delivered into the flow comprising the electrolyte, the positive fuel ions and the unoxidized fuel exiting the anode 308 and flowing across the gap 310. The oxidizer may be any suitable oxidizer, and typically would be oxygen gas, or ambient air. The oxidizer may be mixed or dissolved in solution with an electrolyte for supply to the gaps 310, or delivered directly without an electrolyte. For example, the oxidizer may be oxygen or ambient air sparged into the flow present in each gap 310. In other embodiments, the conduits 320 may lead directly to the cathodes 306, and thus the oxidizer is introduced to the flow within the cathodes 306.

Also, the cathode may be a passive or breathing cathode (as discussed below), and the oxidizer input would be the surface area where oxidizer permeation takes place.

The flow now comprising the electrolyte, the positive fuel ions, the unoxidized fuel, and the oxidizer flows through the cathode 306. As mentioned above, an acceptably small amount of oxidizer may contact the anode 308, and be reduced at the anode 308 and parasitically react with fuel ions generated by the anode oxidation; but the flow across the gap ensures that a large amount of the oxidizer is driven to the cathode 306. At the cathode 306, the oxidizer is reduced with electrons conducted to the cathode 306 into at least negative oxidizer ions such that the negative oxidizer ions react with the positive fuel ions. The cathode 306 is selective for reduction of the oxidizer in preference to oxidation of the unoxidized fuel. As a result, the flow exiting the cathode 306 comprises the electrolyte, the unoxidized fuel, and the by-product of the reaction of the positive fuel ions and the negative oxidizer ions. After exiting the cathode 306 (or the last cathode 306 in array of such fuel cells 300), the flow can exit the housing 304 via conduit 322.

The term "selective", with respect to the reduction or oxidation activity of an electrode and reactants describes a preference for one reaction (specifically, oxidizer reduction) over the other (i.e., fuel oxidation). An electrode that is selective for oxidizer reduction allows the oxidizer reduction reaction to occur more easily than the fuel oxidation reaction. Likewise, the converse is true for an electrode that is selective for fuel oxidation. The selectivity of many materials is well known and readily determinable from literature or common knowledge in the electrochemistry arts.

To understand how the relative selectivity of an electrode may be determined, consider an electrode immersed in a solution comprising an electrolyte and stoichiometric amounts of fuel and oxidizer. Stoichiometric in this context means that the fuel and oxidizer should be in a proportion such that the oxidation/reduction reactions will release/accept the same amount of electrons at a potential where both reactions are thermodynamically favored and occur at the same rate (e.g., if $H_2$ is the fuel, and $O_2$ is the oxidizer, twice as much $H_2$ should be used because $H_2$ oxidizes to $2H^+ + 2e^-$, and $O_2$ accepts $4e^-$ and reduces to $2O^{2-}$, and thus twice as much $H_2$ is required to balance out the electron acceptance of the $O_2$ reduction). If the electrode is perfectly non-selective with respect to the reactions, then both the oxidation and reduction reactions will occur with the facility defined by the specifics of the reaction. This may be determined by integrating the measured current to obtain the total charge accumulated over a specified time at a potential away from open circuit condition, providing a measure of the electrochemical behavior of the reactions. If the electrode is perfectly non-selective, then no current should be detected, as the electrons generated by fuel oxidation will be parasitically consumed by the oxidizer reduction at the electrode—leading to zero net external current and hence no preference to either reaction.

But if the electrode is selective to either reaction, then the measured current will exhibit a dominance of the preferred reaction over the non-preferred reaction. For example, a manganese electrode in an alkaline electrolyte has a high facility for oxygen reduction, but provides for little or no activity for methanol oxidation. Thus, the external current observed will be dominated (almost entirely) by the oxygen reduction reaction (the electrode will behave strongly as a positive terminal drawing electrons to support the oxygen reduction).

Because selectivity is a relative term, for purposes of this application a selective electrode and a non-selective electrode may be defined as having the following measurable characteristics and described using the following testing procedures. As discussed above, to identify selectivity the electrode is immersed in a solution comprising the electrolyte and stoichiometric amounts of the fuel and oxidizer (each being of the same type to be used in the operational cell). This is done at the same operating conditions for the cell to ensure that the selectivity characteristics measured will be same during cell operation (e.g., if the cell is to be operated at standard conditions, for example, 1 atm and 20 degrees C., then the same conditions, including pH, will be used for this measurement). The external current is then measured in the potential range of interest. This will show the reaction to which the electrode is selective (either the fuel oxidation or the oxidizer reduction). Then, for a comparative analysis, the electrode is cleaned and immersed in a solution under the same conditions with just the electrolyte and the preferred reactant, but without the non-preferred reactant, and the external current is measured again. The current measured with both reactants is then determined as a percentage of the current measured with just the preferred reactant, and the amount of selectivity may be described in terms of that percentage.

As an example, if this comparative analysis reveals that the electrode is selective to reduction of the oxidizer, and the measured current with both reactants is 90% of the measured current with just the oxidizer, then the electrode may be described as being 90% selective to the oxidizer reduction in the context of that fuel cell. And a perfectly selective electrode would be described under this analysis as being 100% selective, as the non-preferred reaction would not take place at all. In the context of this application and the appended claims, an electrode that is "selective" to one reaction in preference to the other is defined as one that is 10% or more selective to a reaction in accordance with the procedure described above (or another test that quantifies selectivity in the same terms). Any electrode that is less than 10% selective to one reaction in preference to the other is defined as being "non-selective."

In the context of this partial mixed reaction approach, the cathode 306 is as highly selective as possible for the oxidizer reduction to minimize the parasitic effects of fuel reduction taking place at the cathode 306. Preferably, the cathode 306 is more than 50%, 70%, 85% or 90% selective for the oxidizer reduction. Conversely, it is preferred that the anode 308 be non-selective, as non-selective materials tend to be more efficient. However, the anode 308 may also be selective for fuel oxidation in some embodiment, and may be slightly selective for fuel oxidation, such as 30%, 25% or less.

Figure 5:
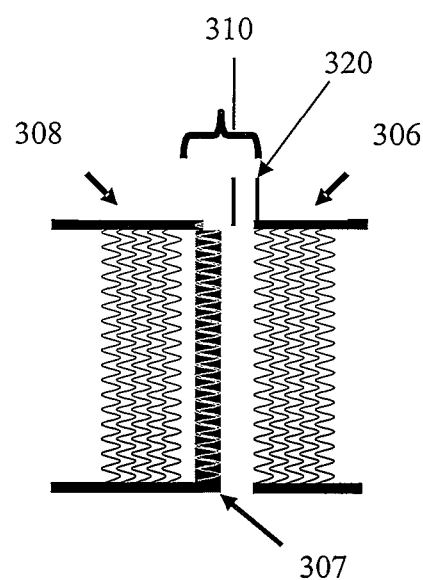
FIG. 5 is a schematic cross-section showing the location of a barrier structure between an anode and cathode.

To minimize or eliminate the migration of oxidizer to the anode 308 where it may react parasitically, a porous, non-conductive, non-reactive oxidizer barrier structure may optionally be disposed at the exit side of the anode 308, which may be between the anode 308 and the introduction point for the oxidizer into the gap. For example, a honeycomb structure, porous frit or porous membrane may be used, and preferably is disposed over the entire surface of the anode facing the cathode. Such a structure may help keep the flow oriented towards the cathode 306 (e.g., a structure with conduits oriented in the flow direction towards the cathode). It may also function to discourage the migration of bubbles of the oxidizer toward the anode 308 (particularly if the oxidizer is introduced into the gap by sparging). Such a structure may also help direct or deflect the introduction of the oxidizer somewhat parallel to or away from the anode. As examples, such a barrier structure may comprise an array of tubes (such as made of Teflon®), or a screen (such as made from polypropylene or any other porous material that will allow flow of the mixture exiting the anode therethrough). Such a barrier structure could also be formed integrally onto the anode, such as by laminating or bonding, to create a layer that allows exit flow of the mixture from the anode, but discourages the oxidizer from flowing into contact with the anode. FIG. 5 is a schematic figure illustrating an exemplary placement of such a barrier structure 307.

It is within the scope of the invention to practice this partial mixed reactant approach with just one fuel cell, i.e., one anode 308 and one cathode 306. For example, the fuel cells described above with respect to FIGS. 1-3 may be used with this partial mixed reactant approach and maintain the same general structure. It is also possible to use multiple fuel cells as shown in FIG. 4, which are arranged in a sequential array such that the flow runs through each fuel cell 300 in the array.

In a series array, the fuel cell 300 may be positioned adjacent a second fuel cell 300 comprising a second anode 308 and a second cathode 306. The same reference numbers are used, as the cells 300 are the same. The second anode 308 and the second cathode 306 are spaced apart to define a second gap 310, just as was the case with the first fuel cell in the array, and they may be made from the same materials.

The method then further comprises flowing the flow exiting the cathode 306 of the first fuel cell 300 through the second anode 308 to oxidize the fuel. Preferably, the fuel is still present in the flow flowing through the second anode 308 at a concentration high enough that only part of the fuel flowing through the second anode 308 is oxidized. And thus, the flow exiting the second anode 308 comprises the electrolyte, the positive fuel ions, and the unoxidized fuel. However, it is possible that the fuel concentration entering the second or last fuel cell 300 in the array could be low enough that it is essentially all consumed at the second anode 308.

It is permissible to allow some unreduced oxidizer to exit the cathode 306 in the flow flowing to the second anode 308. Because the second anode 308 may also be non-selective, the oxidizer will reduce at the anode, which creates a parasitic effect because the reduced oxidizer will react directly with the electrons created by the fuel oxidation (which means that those electrons will not flow to power the circuit). However, this result is permissible in some embodiments, as the fuel saturation in the electrolyte can be very high (up to 100× or more than the oxidizer), and thus the overall effect on efficiency is not as significant, or at least is outweighed by the benefit of the high fuel saturation. Also, the presence of limited amounts of excess oxidizer may be viewed as an acceptable occurrence, as it indicates that the cathode 306 is being used at or very close to its full capacity for oxidizer reduction; and because the fuel is in a very high concentration, the same is occurring at the anode, which means that the fuel cell is operating close to its maximum efficiency such that a small amount of parasitic activity at the second anode is acceptable. As an option, it is within the scope of the invention to precisely control the oxidizer introduction to match the exact amount of oxidized fuel flowing to the cathode 306 to reduce or eliminate this parasitic effect at the second anode 308 (but in some instances this is less preferable, as erring on using too little oxidizer could reduce the oxidizer reduction activity at the cathode, also reducing the produced power). It is also within the scope of the invention to use a permeable screen on the exit side of the cathode 306 (or inlet side of the subsequent anode 308), such as a tight polypropylene screen that discourages or prevents the transport of unreduced oxidizer (e.g., $O_2$), and diverts the unreduced oxidizer to a lateral exit port for capture. For any given cell, the cost/benefit analysis of using one of these features can be balanced to determine whether the parasitic effect of excess oxidizer in the cathode effluent is acceptable or requires management. However, in most instances this is unnecessary.

As another option, instead of using fuel cells in series as illustrated, the system could be designed to have a plurality of fuel cells in parallel. Thus, any oxidizer exiting the cathodes 306 will not be in contact with a subsequent anode 308. And if the cathode effluent is to be recirculated, all the effluent flows can be directed a single separator device that is capable of extracting the oxidizer (e.g., where the oxidizer is oxygen, flowing the effluent through a low pressure or heated chamber can cause the oxygen to bubble out of solution). This may be a preferred option to avoid any issues with respect to parasitic loss that may occur in a series arrangement.

Turning back to the continued flow through the second cell 300, the flow comprising the electrolyte, the positive fuel ions and the unoxidized fuel exiting the second anode the flows across the second gap 310 to the second cathode 306. The oxidizer is delivered into the second gap 310 between the second anode 308 and the second cathode 306 such that the oxidizer is delivered into that flow. Alternatively, as mentioned above, the oxidizer may be delivered directly to the second cathode 306. And the resulting the flow comprising the electrolyte, the positive fuel ions, the unoxidized fuel, and the oxidizer flows through the second cathode 306. And finally, the oxidizer is reduced at the second cathode 306 with electrons conducted to the second cathode into at least negative oxidizer ions such that the negative oxidizer ions react with the positive fuel ions. As was the case with the first fuel cell, the second cathode 306 is selective for reduction of the oxidizer in preference to oxidation of the unoxidized fuel, whereby the flow exiting the second cathode 306 comprises the electrolyte, the unoxidized fuel, and the by-product of the reaction of the positive fuel ions and the negative oxidizer ions.

Any number of cells can be connected together in series similar to the first and second cells discussed above. Thus, there is a provided a method for generating electrical current using N fuel cells, wherein N is any integer greater than 1 (2, 10, 50, etc.). As discussed, each fuel cell comprises the cathode 306 and the anode 308 spaced apart by the gap 310 therebetween. And as shown in FIG. 4, each fuel cell 300 is arranged in an array such that the cathode 306 of each of fuel cell 300 at positions 1 to N−1 in the array is communicated to the anode 308 of the subsequent fuel cell.

In this method, the flow comprising the fuel and electrolyte is flowed through the array with the flow flowing through the anode 308 and the cathode 306 of each fuel cell 300 in the array, and the oxidizer is delivered into the flow downstream of the anode 308 of each fuel cell 300 in the array (e.g., either directly to the cathode or into the gap) such that:

(i) each anode 308 oxidizes the fuel into at least electrons for conduction by the anode 308 and positive fuel ions, the fuel being present in the flow flowing through the anodes 308 of the fuel cells 300 at at least positions 1 to N−1 in the array at concentrations high enough that only part of the fuel flowing through the anodes 308 is oxidized, wherein the flow exiting the anodes of the fuel cells 300 at positions 1 to N−1 in the array comprises the electrolyte, the positive fuel ions, and the unoxidized fuel, and wherein the flow exiting the anode 308 of the fuel cell at position N in the array comprises the electrolyte and the positive fuel ions;

(ii) the flow exiting the anodes 308 of the fuel cells 300 flows across the associated gaps 310 to the associated cathodes 306;

(iii) the oxidizer delivered into the flow downstream of the anodes 308 is exposed to the associated cathodes 306;

(iv) the oxidizer is reduced at the cathode 306 of each fuel cell 300 with electrons conducted to the cathode 306 into at least negative oxidizer ions such that the negative oxidizer ions react with the positive fuel ions in the mixture flowing through each cathode 306, each of the cathodes 306 of the fuel cells 300 being selective for reduction of the oxidizer in preference to oxidation of the unoxidized fuel, wherein the flow exiting the cathodes 306 of the fuel cells 300 at positions 1 to N−1 comprises the electrolyte, the unoxidized fuel, and the by-product of the reaction of the positive fuel ions and the negative oxidizer ions, and wherein the flow exiting the cathode 306 of the fuel cell 300 at position N in the array comprises the electrolyte and the by-product of the reaction of the positive fuel ions and negative oxidizer ions;

(v) the flow exiting the cathode 306 of each fuel cell 300 at positions 1 to N−1 in the array flows to the anode 308 of the subsequent fuel cell for delivering the electrolyte and unoxidized fuel to the subsequent anode 308 for oxidation; and (vi) the flow exits the cathode 306 of the fuel cell 300 at position N in the array.

As can be seen, the flow behavior and reactions in the first and subsequent fuel cells are essentially the same. As such, any number of such fuel cells may be arranged together in a sequential array to increase the collective power output of the fuel cells 300.

As an option, the possibility of pressure drop that will be experienced as the overall flow passes through each anode 308 and cathode 306 can be managed by increasing the pressure in the flow introduced into the first cell, and/or by providing supplemental pressure along the flow path through the array. For example, a sub-array of fuel cells 300 in a housing may output the flow to a pump, which then outputs the flow at increased pressure to a subsequent sub-array of fuel cells 300 in a subsequent housing. Likewise, the possibility of pressure drop may be managed by the geometry of the housing and fuel cells. For example, the array in FIG. 4 could be wider at the upstream end, and narrow at the downstream end, such as would be provided by a housing with a frustroconical or trapezoidal configuration. Because pressure is a function of area, the decreasing area in the downstream direction can reduce the pressure drop. By managing the pressure drop (in whatever manner chosen), more fuel cells 300 can be arranged in the array, thus increasing the collective power output and density.

An advantage of introducing the oxidizer separately downstream of the anode 308 (e.g., either into the gap 310 upstream of the cathode 306 or directly to the cathode 306) is that the saturation limit of oxidizer in the electrolyte is not a significant limiting factor in cell design and performance, as is the case with prior approaches. Specifically, because the oxidizer exposure to the cathode is not correlated directly to flow rate through the entire cell, the flow rate does not have to be increased to increase exposure of oxidizer to the cathodes. This, in turn, means that the system is more efficient because less flow generation energy is required to drive the cell.

As an option, to maintain the fuel concentration at a sufficiently high level such that unoxidized fuel flows through all the anodes 308, the fuel and electrolyte source may be coupled to a supplementary fuel supply to maintain the concentration in the fuel and electrolyte source 312 at a sufficiently high level. A controller could control the delivery of supplemental fuel to the source 312 based on a predetermined schedule (e.g., which may be determined based on knowledge of the rate of fuel consumption by the fuel cell(s) 300). The voltage, current and/or power being output from one or more of the cell(s) 300 may also be monitored by a monitoring device (e.g., a current, voltage, or power sensor, as applicable), and if the signal drops below a certain threshold, the controller can trigger delivery of supplemental fuel to the source 312 to increase the fuel concentration.

It is envisioned that this monitoring may only take place at the last fuel cell 300 in the array, as that will be the first cell to suffer a drop-off in performance if the fuel concentration decreases (i.e., typically because all or essentially all the fuel will have been consumed before reach the anode 308 of the last fuel cell). However, it is possible to monitor the output of all the fuel cells 300 collectively or individually.

Monitoring such performance of one or more of the fuel cells 300 can also be used to control delivery of the oxidizer to the gaps 310. For example, if the controller determines that increasing the fuel concentration is not increasing the overall power, voltage and/or current input of one or more of the cells, it may then be assumed that a lack of fuel is not the issue, and the controller can then trigger an increase in the flow rate of oxidizer. Conversely, excess oxidizer can likewise detract from cell efficiency. If excess oxidizer is delivered and is not fully or essentially fully reduced at the cathode(s) 306, the excess oxidizer may be reduced at the next anode and parasitically react with the oxidized fuel, thus consuming electrodes that would otherwise be output as power. As such, the controller may also be configured to reduce the flow of oxidizer.

And likewise, the controller may be configured to output a signal alerting the user or other technician that neither increased fuel nor increased/decreased oxidizer is improving fuel cell performance as expected. This can signal a need to replace or clean the anodes and cathodes, whose porous structures may become clogged or contaminated over prolonged periods of usage. Likewise, it may signal a need to replace or replenish the electrolyte, as it may lose performance characteristics over prolonged periods of usage.

Such controllers suitable for controlling fluid flow and the delivery of fuel and/or oxidizer are well known and need not be described herein. They can be logic based microprocessor controllers, or hard wired analog controllers, or any other suitable types of controllers. And the flow rate can be controlled by using the controller to control pumps and/or valves to control the flow rate of the fuel and/or oxidizer.

The electrolyte may be an aqueous solution, and the positive fuel ions and the negative oxidizer ions react at the cathode(s) 306 to form water that becomes part of the aqueous electrolyte such that the flow exiting the cathode(s) 306 comprises the aqueous electrolyte and the unoxidized fuel. That is, because the electrolyte is aqueous, and the reaction by-product is water, the water simply becomes part of the electrolyte. This is beneficial, as the electrolyte can continually be re-used, and would only need to be supplemented periodically.

The flow exiting the last cathode 306 (whether there is one fuel cell 300 or an array, in which case it would be the fuel cell at position N in the array) can be delivered back to the fuel and electrolyte source 312 for recirculation as part of the fuel and electrolyte mixture being flowed through the fuel cell(s). Conduit 324 is provided for this purpose, and an optional check valve 326 may be provided on the conduit is desired. In some embodiments, the flow exiting the cathode of the fuel cell at position N in the array may be essentially devoid of unoxidized fuel, as all the fuel has been oxidized by the anode(s) 308. And in some embodiments, the fuel may also be present in the flow flowing through the anode 308 of the last fuel cell at position N in the array at a concentration high enough that only part of the fuel flowing through the anode is oxidized, whereby the flow exiting the cathode of the fuel cell at position N further comprises unoxidized fuel. Either way, this output can be circulated back to the fuel and electrolyte flow flowing through the array.

Partial mixed reactant embodiments may have a number of advantages. First, because the PEM membrane between the electrodes is eliminated, the associated problems and attendant plant and maintenance costs are likewise eliminated. Also, power efficiency can be very high because of the over-concentration of fuel used, which ensures a high amount of fuel oxidation at the anode, and complex control systems are not required to precisely control the fuel amount. Further, such an approach is amenable for use with electrodes having very large surface areas, which means a greater power output because of the increased areas for oxidation and reduction activities. Moreover, because the oxidizer is introduced downstream of the anode, the flow rate is not a direct limiting factor for oxidizer exposure to the cathode, and thus less flow is needed (which reduces overall power efficiency).

Any of the foregoing embodiments, as well as any other embodiment, may be practiced with a "breathing" cathode, also referred to as a passive cathode. A passive or breathing cathode is passively exposed to the oxidizer source (typically oxygen present in ambient air) and absorbs the oxidizer for consumption in the fuel cell reactions. Thus, the oxidizer need not be actively pumped or otherwise directed to the cathode, such as via an inlet. Thus, any part of the cathode by which the oxidizer is absorbed or otherwise permeates or contacts the cathode may be generically referred to as an "input." And the term input may broadly encompass all ways of delivering oxidizer to the cathode (and that term may similarly be used with reference to any way of delivering fuel to the anode).

Likewise, in any embodiment, the cathode need not be porous such that the flow of electrolyte and fuel ions flows through it. Instead, the flow could simply contact the non-porous cathode such that the fuel ion-oxidizer ion reaction occurs at an external surface of the cathode (non-porous meaning that there are no pores, or the pores are so small that there is no perceptible penetration of the flow). This technique may be used with a breathing or passive non-porous cathode, where the cathode material is capable of transporting the reduced oxidizer ions to its external surface for reaction with the fuel ions. Thus, any flow of fuel/electrolyte contacting the cathode and flowing away from it may be generally described as "leaving" the cathode (a term which is also broad enough to cover a flow that enters a porous cathode and exits it as well, as described above). Reference may be made to U.S. Pat. No. 5,514,486, which is incorporated herein.

In addition to any fuel, oxidant, electrolyte or catalyst material mentioned above, any of the following in various combinations may be used in any of the embodiments described above, as well as in any other embodiment within the scope of any aspect of the invention.

Electrodes/Catalysts: Platinum, Platinum black, Platinized metal (any), Nickel, Nickel Hydroxide, Manganese, Manganese Oxides (all states), Palladium, Platinum Ruthenium alloys, Nickel Zinc alloys, Nickel Copper alloys, Gold, Platinum black supported on metal oxides, Platinum Molybdenum alloys, Platinum Chromium alloys, Platinum Nickel alloys, Platinum Cobalt alloys, Platinum Titanium alloys, Platinum Copper alloys, Platinum Selenium alloys, Platinum Iron alloys, Platinum Manganese alloys, Platinum Tin alloys, Platinum Tantalum alloys, Platinum Vanadium alloys, Platinum Tungsten alloys, Platinum Zinc alloys, Platinum Zirconium alloys, Silver, Silver/Tungsten Carbide, Iron tetramethoxyphenyl porphorin, Carbon or Carbon Black.

Fuels: Formic acid, Methanol, Ethanol, 1-proponal, 2-propoanl, Cyclobutanol, Cyclopentanol, Cyclohexanol, Benzyl alcohol, Lithium, Zinc, Aluminum, Magnesium, Iron, Cadmium, Lead, Acetaldehyde, Propionaldehyde, Benzaldehyde, Ethylene glycol, Glyoxal, Glycolic acid, Glyoxylic acid, Oxalic acid, 1,2-propanediol, 1,3-propanediol, Glycerol, Hydrogen, Vandium(II)/Vanadium(III), Carbon Monoxide, Sodium Borohydride, Other Borohydrides (e.g. Potassium), and other metal redox systems e.g.: Iron/chromium, Nickel/cadmium.

Oxidants: Air, Oxygen gas, Dissolved Oxygen, Hydrogen Peroxide, Potassium Permanganate, Vanadium(IV)/Vanadium(V) and Manganese Oxide.

Electrolytes: Potassium Hydroxide, Sodium Hydroxide, Sulfuric acid, Nitric acid, Formic acid, Phosphoric acid, Trifluoromethanesulfonic acid (TFMSA), Ionic liguids (all types), Acetimide, Flouroalcohol emulsions, and Perflourocarbon emulsions (e.g. Flourinert®)

The foregoing illustrated embodiment(s) have been provided solely for illustrating the structural and functional principles of the present invention and are not intended to be limiting. To the contrary, the present invention is intended to encompass all modifications, substitutions, alterations, and equivalents within the spirit and scope of the following appended claims.

The invention claimed is:

1. An electrochemical cell for use with an electrode and reactants comprising a fuel and an oxidizer, comprising:
   electrodes comprising: (i) an anode communicated to the fuel source for receiving the fuel and oxidizing the fuel into at least oxidized fuel ions and electrons, and (ii) a cathode communicated to the oxidizer source for accepting electrons and reducing the oxidizer into at least reduced oxidizer ions;
   the anode and the cathode being spaced apart to define a gap between opposing gap facing surfaces thereof and being connectable to a load;
   a first input into the cell for directly delivering a first of the reactants selected from the group consisting of: the fuel and the oxidizer to a first of the electrodes to produce a first output;
   a second input into the cell for directly delivering a second of the reactants to a second of the electrodes, the second of the reactants being different from the first reactant, and the second input being separate from the first input to the first of the electrodes and configured for combining with the first output, and wherein the fuel and the oxidizer are each input from a source external to the fuel cell;

a flow generator for generating a transport flow comprising the electrolyte and the ions formed from the first reactant oxidized or reduced at the first electrode that exits the gap facing surface of the first electrode and into the gap such that the transport flow flows essentially perpendicularly to the opposing gap facing surfaces of the electrodes and transports the ions of the first output formed from the first reactant for reaction with the ions formed from the second reactant oxidized or reduced at the second electrode, to form a second output that exits the second electrode, the second output comprising a mixture which results in a product and the electrolyte exiting the second electrode.

2. An electrochemical cell according to claim 1, wherein said flow generator is configured to generate said transport flow across said gap from the first electrode to the second electrode.

3. A fuel cell for use with an electrolyte and reactants comprising a fuel and an oxidizer comprising:

electrodes comprising: (i) an anode for oxidizing the fuel into at least oxidized fuel ions and electrons, and (ii) a cathode for accepting electrons and reducing the oxidizer into at least reduced oxidizer ions;

the anode and the cathode being spaced apart to define a gap between opposing gap facing surfaces thereof and being connectable to a load;

a first input into the cell for directly delivering a first of the reactants selected from the group consisting of: the fuel and the oxidizer to a first of the electrodes to produce a first output, the first input being upstream of or at the first electrode;

a second input into the cell for directly delivering a second of the reactants to a second of the electrodes, the second of the reactants being different from the first reactant, and the second input being separate from and downstream of the first electrode such that the second of the reactants is configured for combining with the first output, and wherein the fuel and the oxidizer are each input from a source external to the fuel cell; and a flow generator for generating a transport flow of the electrolyte exiting the gap facing surface of the first electrode and flowing essentially perpendicularly to the opposing gap facing surfaces of both the electrodes to the gap facing surface of the second electrode across the gap to transport the ions of the first output formed from the first reactant oxidized or reduced at said first electrode for reaction with the ions formed from the second reactant oxidized or reduced at the second electrode, to form a second output that exits the second electrode, the second output comprising a mixture which results in a product and the electrolyte exiting the second electrode.

4. A fuel cell according to claim 3, wherein the flow generator is configured to generate said transport flow across the gap at a rate higher than a diffusion rate of the second reactant oxidized or reduced at the second electrode within the electrolyte to essentially prevent diffusion thereof to said first electrode.

5. A fuel cell according to claim 4, wherein the anode and the fuel are the first electrode and the first reactant, the cathode and the oxidizer are the second electrode and the second reactant, and the flow generator is configured to generate the transport flow in an anode-to-cathode direction.

6. A fuel cell according to claim 4, further comprising a fuel source comprising the fuel and communicated to the anode.

7. A fuel cell according to claim 6, wherein the anode and the fuel are the first electrode and the first reactant, the cathode and the oxidizer are the second electrode and the second reactant, and the flow generator is configured to generate the transport flow in an anode-to-cathode direction, wherein the fuel Source is part of a fuel and electrolyte source communicated to the anode and comprising the fuel and the electrolyte.

8. A fuel cell according to claim 4, further comprising an oxidizer source comprising the oxidizer and communicated to the cathode.

9. A fuel cell according to claim 8, wherein the anode and the fuel are the first electrode and the first reactant, the cathode and the oxidizer are the second electrode and the second reactant, and the flow generator is configured to generate the transport flow in an anode-to-cathode direction, wherein the oxidizer source is communicated to the gap to deliver the oxidizer to the transport flow between the anode and the cathode.

10. A fuel cell according to claim 4, wherein the cathode has an anode receiving space therein and wherein the anode is received within the anode receiving space with the gap between the anode and the cathode.

11. A fuel cell according to claim 10, wherein the cathode has an annular configuration surrounding the anode receiving space.

12. A fuel cell according to claim 11, wherein the cathode has a circular configuration with an inner diameter and an outer diameter.

13. A fuel cell according to claim 12, wherein the anode has a circular configuration with an outer diameter smaller than the inner diameter of the cathode to define the gap.

14. A fuel cell according to claim 4, wherein the flow generator is a pump operable to generate said transport flow.

15. A fuel cell according to claim 4, wherein the flow generator is a rotary driver operable to rotate the anode and the cathode so as to generate said transport flow by centrifugal force.

16. A fuel cell according to claim 7, wherein the fuel and electrolyte source comprises a mixture of the fuel and the electrolyte.

17. A fuel cell according to claim 7, wherein the fuel and electrolyte source comprises a first chamber for containing the electrolyte and a second chamber for containing the fuel, each of the first and second chambers being communicated to the anode.

18. A, fuel cell according to claim 6, wherein the fuel is a hydrocarbon.

19. A fuel cell according to claim 18, wherein the fuel is methanol.

20. A fuel cell according to claim 4, wherein each of the anode and the cathode is non-selective for both the fuel oxidation and oxidizer reduction.

21. A fuel cell according to claim 18, further comprising an oxidizer source comprising the oxidizer, wherein the oxidizer is oxygen.

22. A fuel cell according to claim 4, further comprising an oxidizer source comprising the oxidizer and communicated to the cathode:

wherein the anode and the fuel are the first electrode and the first reactant, the cathode and the oxidizer are the second electrode and the second reactant, the flow generator is configured to generate the transport flow in an anode-to-cathode direction; and wherein the flow generator is configured to generate said transport flow across the gap at a rate higher than a diffusion rate of the oxidizer within the electrolyte to essentially prevent diffusion of the oxidizer to the anode.

23. A fuel cell according to claim 6, wherein the cathode and the oxidizer are the first electrode and the first reactant, the anode and the fuel are the second electrode and the second reactant, the flow generator is configured to generate the transport flow in an cathode-to-anode direction; and
wherein the flow generator is configured to generate said transport flow across the gap at a rate higher than a diffusion rate of the fuel within the electrolyte to essentially prevent diffusion of the fuel to the porous body of the cathode.

24. A fuel cell according to claim 3, further comprising a housing including a first plate and a second plate, the anode and the cathode being disposed between the first and second plates.

25. A fuel cell according to claim 3, further comprising a conduit extending between the anode and the cathode and defining said gap, and wherein the anode and the fuel are the first electrode and the first reactant, the cathode and the oxidizer are the second electrode and the second reactant, and the flow generator is configured to generate the transport flow in an anode-to-cathode direction,
the first input being a fuel inlet of the conduit for connection to a fuel and electrolyte source, the fuel inlet being located upstream of the anode such that the fuel and electrolyte flows through the anode exiting its gap facing surface and into the gap;
the second input being an oxidizer inlet of the conduit for connection to an oxidizer source, the oxidizer inlet being separate from and downstream of the anode at the gap such that the oxidizer is directly delivered to the transport flow between the anode and the cathode so that the electrolyte, oxidized fuel, and the oxidizer flow to and through the opposing gap facing Surface of the cathode for reduction of the oxidizer at the cathode and reaction of the reduced oxidizer and the oxidized fuel.

26. A fuel cell system comprising:
a fuel source comprising a fuel;
an oxidizer source comprising an oxidizer, the fuel and the oxidizer being reactants;
electrodes comprising: (a) an anode communicated to the fuel source for receiving the fuel and oxidizing the fuel into at least oxidized fuel ions and electrons, and (b) a cathode communicated to the oxidizer source for accepting electrons and reducing the oxidizer into at least reduced oxidizer ions;
the anode and the cathode being spaced apart to define a gap between opposing gap facing surfaces thereof and being connectable to a load;
a first input into the cell for directly delivering a first of the reactants selected from the group consisting of: the fuel and the oxidizer to a first of the electrodes to produce a first output, the first input being upstream of or at the first electrode;
a second input into the cell for directly delivering a second of the reactants to a second of the electrodes, the second of the reactants being different from the first reactant, and the second input being separate from and downstream of the first electrode such that the second of the reactants is configured for combining with the first output, and wherein the fuel and the oxidizer are each input from a source external to the fuel cell;
an electrolyte in the gap between the anode and the cathode;
a flow generator for generating a transport flow of the electrolyte exiting the gap facing surface of the first electrode and flowing essentially perpendicularly to the opposing gap facing surfaces of both the electrodes to the gap facing surface of the second electrode across the gap to transport the ions of the first output formed from the first reactant oxidized or reduced at said first electrode for reaction with the ions formed from the second reactant oxidized or reduced at the second electrode, to form a second output that exits the second electrode, the second output comprising a mixture which results in a product and the electrolyte exiting the second electrode.

27. A fuel cell system according to claim 26, wherein the flow generator is configured to generate said transport flow across the gap at a rate higher than a diffusion rate of the second reactant oxidized or reduced at the second electrode within the electrolyte to essentially prevent diffusion thereof across the gap to said first electrode.

28. A fuel cell system according to claim 26, further comprising a conduit extending between the anode and the cathode and defining said gap, and wherein the anode and the fuel are the first electrode and the first reactant, the cathode and the oxidizer are the second electrode and the second reactant, and the flow generator is configured to generate the transport flow in an anode-to-cathode direction,
wherein the fuel source is a fuel and electrolyte source,
the first input being a fuel inlet of the conduit connected to a fuel and electrolyte source, the fuel inlet being located upstream of the anode such that the fuel and electrolyte flows through the anode exiting its gap facing surface and into the gap;
the second input being an oxidizer inlet of the conduit connected to the oxidizer source, the oxidizer inlet being separate from and downstream of the anode at the gap such that the oxidizer is directly delivered to the transport flow between the anode and the cathode so that the electrolyte, oxidized fuel, and the oxidizer flow to and through the opposing gap facing surface of the cathode for reduction of the oxidizer at the cathode and reaction of the reduced oxidizer and the oxidized fuel.

29. A fuel cell system according to claim 26, further comprising a conduit extending between the anode and the cathode and defining said gap, and wherein the cathode and the oxidizer are the first electrode and the first reactant, the anode and the fuel are the second electrode and the second reactant, and the flow generator is configured to generate the transport flow in an cathode-to-anode direction,
wherein the oxidizer source is an oxidizer and electrolyte source,
the first input being an oxidizer inlet of the conduit connected to the oxidizer and electrolyte source, the oxidizer inlet being located upstream of the cathode such that the oxidizer and electrolyte flows through the cathode exiting its gap facing surface and into the gap;
the second input being a fuel inlet of the conduit connected to the fuel source, the fuel inlet being separate from and downstream of the cathode at the gap between the anode and the cathode such that the oxidizer is directly delivered to the transport flow between the cathode and the anode so that the electrolyte, reduced oxidizer, and the fuel flow to and through the opposing gap facing surface of the anode for oxidation of the fuel at the anode and reaction of the oxidized fuel and the reduced oxidizer.

30. A method for generating electrical current using a electrochemical cell for use with an electrolyte and reactants comprising a fuel and an oxidizer, comprising: electrodes comprising: (i) an anode for oxidizing the fuel into at least oxidized fuel ions and electrons, and (ii) a cathode for accepting electrons and reducing the oxidizer into at least reduced oxidizer ions; the anode and the cathode being spaced apart to define a gap between opposing gap facing surfaces thereof and being connectable to a load; a first input into the cell for directly delivering a first of the reactants selected from the group consisting of: the fuel and the oxidizer to a first of the electrodes to produce a first output; a second input into the cell for directly delivering a second of the reactants to a second of the electrodes, the second of the reactants being different from the first reactant, and the second input being separate from the first input to the first of the electrodes such that the second of the reactants is configured for combining with the first output, and wherein the fuel and the oxidizer are each input from a source external to the fuel cell; a flow generator for generating a transport flow comprising the electrolyte and the ions formed from the first reactant oxidized or reduced at the first electrode that flows from the first electrode and into the gap such that the transport flow transports the ions formed from the first reactant for reaction with the ions formed from the second reactant oxidized or reduced at the second electrode, the method comprising:
  delivering the first of the reactants to the first of the electrodes via the first input to produce the first output;
  delivering a second of the reactants to the second of the electrodes via the second input, for combining with the first output;
  wherein the transport flow comprising the electrode and the ions formed from the first reactant oxidized or reduced at the first electrode exist the gap facing surface of the first electrode and flows into the gap as the first output, the transport flow flowing essentially perpendicularly to the opposing gap facing surfaces of the electrodes and transporting the ions formed from the first reactant for reaction with the ions formed from the second reactant oxidized or reduced at the second electrode, to form a second output that exits the second electrode, the second output comprising a mixture which results in a product and the electrolyte exiting the second electrode.

31. A method according to claim 30, wherein said transport flow flows across the gap from the first electrode to the second electrode.

32. A method for generating electrical current using a fuel cell for use with an electrolyte and reactants comprising a fuel and an oxidizer comprising: electrodes comprising: (i) an anode for oxidizing the fuel into at least oxidized fuel ions and electrons, and (ii) a cathode for accepting electrons and reducing the oxidizer into at least reduced oxidizer ions; the anode and the cathode being spaced apart to define a gap between opposing gap facing surfaces thereof and being connectable to a load; a first input into the cell for directly delivering a first of the reactants selected from the group consisting of: the fuel and the oxidizer to a first of the electrodes to produce a first output, the first input being upstream of or at the first electrode; a second input into the cell for directly delivering a second of the reactants to a second of the electrodes, the second of the reactants being different from the first reactant, and the second input being separate from and downstream of the first electrode such that the second of the reactants is configured for combining with the first output, and wherein the fuel and the oxidizer are each input from a source external to the fuel cell; a flow generator for generating a transport flow of the electrolyte exiting the gap facing surface of the first electrode and flowing essentially perpendicularly to the opposing gap facing surfaces of both the electrodes to the gap facing surface of the second electrode across the gap to transport the ions of the first output formed from the first reactant oxidized or reduced at said first electrode for reaction with the ions formed from the second reactant oxidized or reduced at the second electrode, to form a second output that exits the second electrode, the second output comprising a mixture which results in a product and the electrolyte exiting the second electrode; the method comprising:
  delivering the first of the reactants to the first of the electrodes via the first input upstream of or at the first electrode;
  delivering a second of the reactants to the second of the electrodes via the second input downstream of the first electrode at the gap or the second electrode;
  generating the transport flow of the electrolyte across the gap to transport the ions of the first output formed from the first reactant oxidized or reduced at said first electrode for reaction with the ions formed from the second reactant oxidized or reduced at the second electrode, to produce the second output exiting the second electrode,
  wherein the generated transport flow exits the gap faxing surface of the first electrode and flows essentially perpendicularly to the opposing gap facing surfaces of both the electrodes and through the gap facing surface of the second electrode.

33. A method according to claim 32, wherein said transport flow flows across the gap at a rate higher than a diffusion rate of the second reactant oxidized or reduced at the second electrode within the electrolyte to essentially prevent diffusion thereof to said first electrode.

34. A method according to claim 32, wherein the transport flow flows in an anode-to-cathode direction, the fuel and the anode being the first reactant and the first electrode and the oxidizer and the cathode being the second reactant and the second electrode.

35. A method according to claim 32, wherein the anode comprises a porous body that receives the fuel.

36. A method according to claim 32, wherein the cathode comprises a porous body that receives the oxidizer.

37. A method according to claim 35, wherein the cathode comprises a porous body that receives the oxidizer.

38. A method according to claim 37, wherein the porous body of the anode comprises a catalyst material, and wherein the catalyst material catalyzes the fuel oxidation.

39. A method according to claim 37, wherein the porous body of the cathode comprises a catalyst material, and wherein the catalyst material catalyzes the oxidizer reduction.

40. A method according to claim 38, wherein the porous body of the cathode comprises a catalyst material, and wherein the catalyst material catalyzes the oxidizer reduction.

41. A method according to claim 32, wherein the cathode has an anode receiving space therein and wherein the anode is received within the anode receiving space with the gap between the anode and the cathode.

42. A method according to claim 41, wherein the cathode has an annular configuration surrounding the anode receiving space.

43. A method according to claim 42, wherein the cathode has a circular configuration with an inner diameter and an outer diameter.

44. A method according to claim 43, wherein the anode has a circular configuration with an outer diameter smaller than the inner diameter of the cathode to define the gap.

45. A method according to claim 32, wherein a pump generates said transport flow.

46. A method according to claim 32, wherein the anode and the cathode are rotated so as to generate said transport flow by centrifugal force.

47. A method according to claim 32, wherein the oxidizer is oxygen.

48. A method according to claim 47, wherein the oxygen is present in ambient air.

49. A method according to claim 34, wherein the fuel cell comprises a fuel and electrolyte source communicated to the anode and comprising the fuel and the electrolyte.

50. A method according to claim 49, wherein the fuel and electrolyte source comprises a mixture of the fuel and the electrolyte, and wherein the fuel and the electrolyte are provided to the anode by delivering the mixture.

51. A method according to claim 50, wherein the fuel and electrolyte source comprises a first chamber for containing the electrolyte and a second chamber for containing the fuel, each of the first and second chambers being communicated to the anode, wherein the fuel and the electrolyte are provided to the anode from the first and second chambers, respectively.

52. A method according to claim 32, wherein the fuel is a hydrocarbon.

53. A method according to claim 52, wherein the fuel is methanol.

54. A method according to claim 53, wherein each of the anode and the cathode is non-selective for both fuel oxidation and oxidizer reduction.

55. A method according to claim 53, wherein the electrolyte is an aqueous solution.

56. A method according to claim 32, wherein the transport flow flows in an anode-to-cathode direction, the fuel and the anode being the first reactant and the first electrode and the oxidizer and the cathode being the second reactant and the second electrode; and wherein said transport flow is generated at a rate higher than a diffusion rate of the oxidizer within the electrolyte to essentially prevent diffusion of the oxidizer to the anode.

57. A method according to claim 32, wherein the transport flow flows in an cathode-to-anode direction, the oxidizer and the cathode being the second reactant and the second electrode and the fuel and the anode being the second reactant and the second electrode; and wherein said transport flow is generated at a rate higher than a diffusion rate of the fuel within the electrolyte to essentially prevent diffusion of the fuel to the cathode.

* * * * *

UNITED STATES PATENT AND TRADEMARK OFFICE
CERTIFICATE OF CORRECTION

PATENT NO. : 9,780,394 B2
APPLICATION NO. : 11/962803
DATED : October 3, 2017
INVENTOR(S) : Cody A. Friesen et al.

Page 1 of 1

It is certified that error appears in the above-identified patent and that said Letters Patent is hereby corrected as shown below:

On the Title Page

On Page 2, Item (56) References Cited - U.S. Patent Documents, Column 1, Line 38:
After "2003/0077501    April 2003    Knights"
Insert -- 2003/0096150    May 2003    Rice et al.--.

On Page 2, Item (56) References Cited - U.S. Patent Documents, Column 2, Line 13:
After "2006/0076295    April 2006    Leonard"
Insert -- 2006/0078782    April 2006    Martin et al.--.

Signed and Sealed this
Thirteenth Day of March, 2018

Andrei Iancu
*Director of the United States Patent and Trademark Office*